(12) United States Patent
Maeda

(10) Patent No.: US 9,471,247 B2
(45) Date of Patent: Oct. 18, 2016

(54) STORAGE APPARATUS AND AREA RELEASING METHOD

(71) Applicant: FUJITSU LIMITED, Kawasaki-shi, Kanagawa (JP)

(72) Inventor: Jun Maeda, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 304 days.

(21) Appl. No.: 14/098,601

(22) Filed: Dec. 6, 2013

(65) Prior Publication Data
US 2014/0181444 A1 Jun. 26, 2014

(30) Foreign Application Priority Data
Dec. 20, 2012 (JP) .................. 2012-277896

(51) Int. Cl.
*G06F 3/06* (2006.01)

(52) U.S. Cl.
CPC ............... *G06F 3/065* (2013.01); *G06F 3/067* (2013.01); *G06F 3/0611* (2013.01); *G06F 3/0619* (2013.01); *G06F 3/0689* (2013.01)

(58) Field of Classification Search
CPC ........... G06F 11/1451; G06F 11/1458; G06F 3/0617; G06F 3/0689
USPC ...................................................... 711/162
See application file for complete search history.

(56) References Cited

U.S. PATENT DOCUMENTS

| 8,990,527 B1 * | 3/2015 | Linstead ............... G06F 3/0617 711/161 |
| 2006/0085663 A1 | 4/2006 | Sutoh |
| 2008/0120459 A1 | 5/2008 | Kaneda et al. |
| 2009/0222496 A1 | 9/2009 | Liu et al. |
| 2010/0125712 A1 * | 5/2010 | Murase ............... G06F 11/1458 711/162 |
| 2010/0332780 A1 * | 12/2010 | Furuya .................. G06F 3/0689 711/162 |
| 2011/0202735 A1 * | 8/2011 | Kono .................. G06F 11/1451 711/162 |

FOREIGN PATENT DOCUMENTS

| JP | 2006-113927 A | 4/2006 |
| JP | 2008-130080 | 6/2008 |
| JP | 2008-547123 | 12/2008 |
| JP | 2011-13821 A | 1/2011 |

OTHER PUBLICATIONS

Japanese Office Action mailed Jul. 5, 2016 for corresponding Japanese Patent Application No. 2012-277896, with Partial English Translation, 6 pages.

* cited by examiner

*Primary Examiner* — Yong Choe
*Assistant Examiner* — Mohamed Gebril
(74) *Attorney, Agent, or Firm* — Fujitsu Patent Center

(57) ABSTRACT

A storage apparatus performs, in place of a copy process which involves physical resource allocation to a copy destination logical volume, a copy process which allows the copy destination logical volume to refer to an allocation destination managed by a management unit area of a copy source logical volume. A storage unit stores management information relating to the reference destination of the management unit area of the logical volume. A control unit releases the physical resource which has been allocated to the management unit area by exchanging the reference destination of the management unit area specified by a release command from a host computer with the reference destination of the management unit area of the other logical volume corresponding to the specified management unit area.

7 Claims, 33 Drawing Sheets

STORAGE APPARATUS AND AREA RELEASING METHOD

CROSS-REFERENCE TO RELATED APPLICATION

This application is based upon and claims the benefit of priority of the prior Japanese Patent Application No. 2012-277896, filed on Dec. 20, 2012, the entire contents of which are incorporated herein by reference.

FIELD

The embodiments discussed herein relate to a storage apparatus and an area releasing method.

BACKGROUND

There is thin provisioning, as capacity virtualization technology, which allows use of a volume exceeding the physical disk capacity. Thin provisioning allows efficient use of physical resources by managing physical disks collectively as a storage pool and allocating physical resources (capacity of physical disks) according to the amount of data written in a virtualized logical volume.

In addition, there is a technique of performing data backup while attempting to mitigate wasting of physical resources using this thin provisioning (for example, see Japanese Laid-open Patent Publication No. 2008-130080 and Japanese National Publication of International Patent Application No. 2008-547123).

In recent years, virtualized software which performs virtual control of a storage apparatus has been provided with a function capable of releasing physical resources from an area which has not been used since allocation of physical resources.

In addition, as a data backup method for a storage apparatus, there is known Copy-On-Write (COR). Copy-on-write is a function which allows reference to a copy source as it is without copying to a copy destination logical volume even when a copy request is issued, and which performs a copy to the copy destination logical volume when updating data of the copy source. Using such a copy-on-write function mitigates waste of physical resources due to copy processes.

However, immediately releasing physical resources allocated to a copy source logical volume according to a release command of physical resources in a storage apparatus that uses a backup method such as the copy-on-write function may cause the logical volume to lose data stored in the physical resources to be released, since copying to the copy destination logical volume has not yet been performed.

In order to cope with such a data loss, it is desired to allocate physical resources to the copy destination logical volume and save data therein. It may take substantial time until completion of the data saving process depending on the data size, and the physical resource release command may result in a command time-out.

SUMMARY

According to an aspect, there is provided a storage apparatus including a memory configured to store management information relating to a reference destination of a management unit area that a logical volume includes, and one or more processors configured to perform a procedure including, when data copy is performed from a copy source logical volume to a copy destination logical volume by allowing the copy destination logical volume to refer to a physical resource allocated to the management unit area of the copy source logical volume, accepting a release command to release allocation of the physical resource of the management unit area that the copy source logical volume includes, and updating the management information in a manner that exchanges the reference destination of the management unit area that the copy source logical volume includes with the reference destination of the management unit area that the copy destination logical volume includes.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
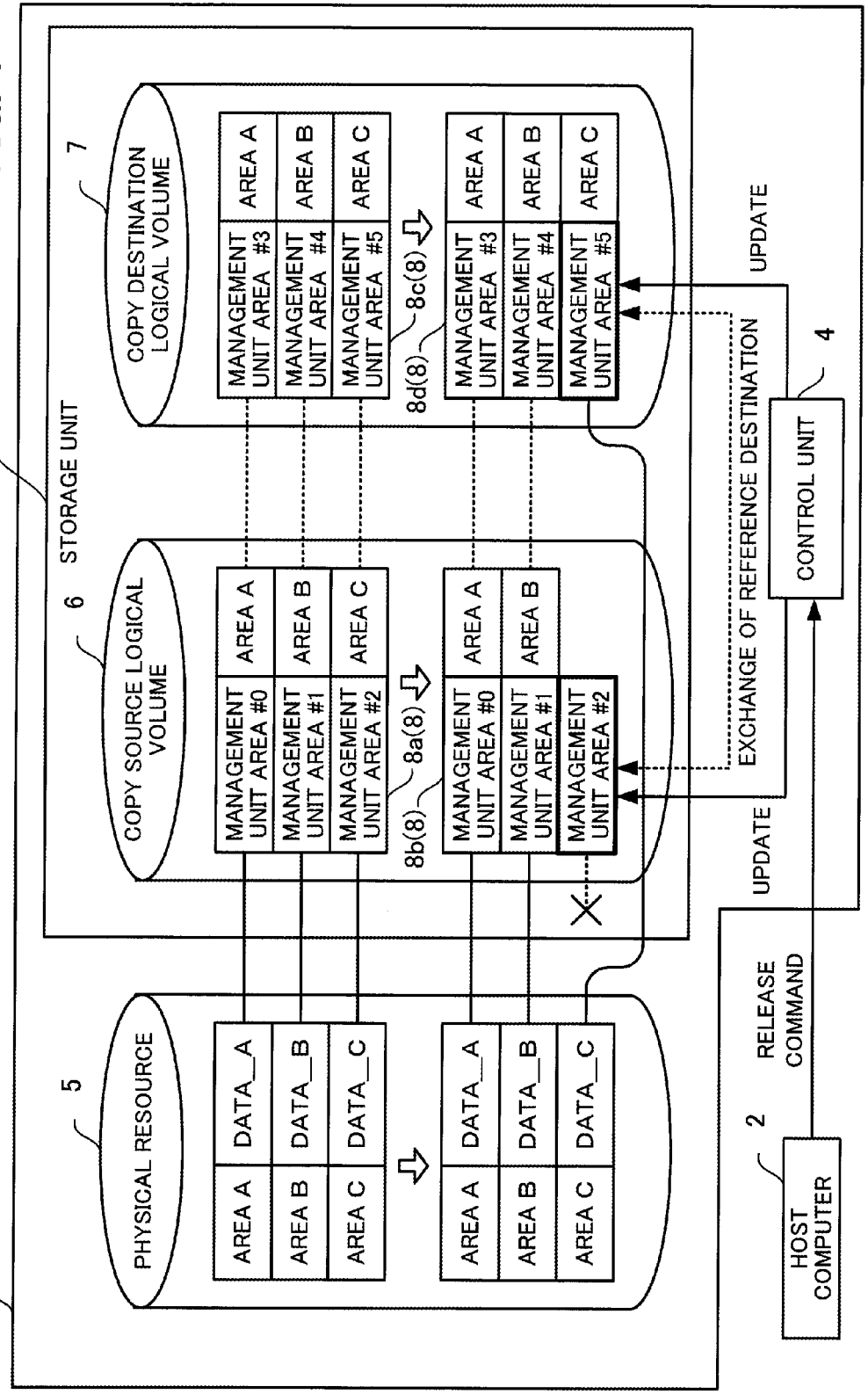
FIG. 1 illustrates an exemplary configuration of a storage apparatus of a first embodiment.

Several embodiments will be described below with reference to the accompanying drawings, wherein like reference numerals refer to like elements throughout.

First Embodiment

First, a storage apparatus of a first embodiment will be described, referring to FIG. 1. FIG. 1 illustrates an exemplary configuration of the storage apparatus of the first embodiment.

A storage apparatus 1 is a control apparatus which performs access control of a physical resource (information storage apparatus) 5. The physical resource 5, which is capable of recording desired information, may be an HDD (Hard Disk Drive), an SSD (Solid State Drive: flash memory drive), or the like. The physical resource 5 may also be a storage pool grouping a plurality of HDDs or SSDs therein.

The storage apparatus 1 is communicably connected to a host computer 2. For example, the host computer 2 provides an operation terminal (not illustrated) with a server function. The storage apparatus 1 accepts a command (release command, I/O command, or the like) from the host computer 2. A release command is a command to release allocation of the physical resource 5 to a logical volume (copy source logical volume 6, copy destination logical volume 7).

The storage apparatus 1 includes a storage unit 3, a control unit 4, and the physical resource 5. The storage apparatus 1 is capable of setting a virtual logical volume. A logical volume has a predetermined number of management unit areas. For example, the copy source logical volume 6 has a management unit area #0, a management unit area #1, and a management unit area #2, whereas the copy destination logical volume 7 has a management unit area #3, a management unit area #4, and a management unit area #5. A logical volume may receive allocation of a physical resource to each management unit area when storing data, and may release a physical resource for each management unit area when allocation of the physical resource has become unnecessary.

A management unit area is uniquely identifiable according to identification information, and the host computer 2 is capable of accessing a particular management unit area according to the identification information. The host computer 2 is capable of instructing allocation and releasing of the physical resource 5 by specifying a management unit area.

The storage apparatus 1 may receive allocation of the physical resource 5 to store data therein. The copy source logical volume 6 has received allocation of the physical resource 5 for the management unit area #0, the management unit area #1, and the management unit area #2. The part of the physical resource 5 (memory area specified by a physical address) allocated to the management unit area #0 is denoted as "area A". Similarly, the parts of the physical resource allocated to the management unit area #1 and the management unit area #2 are denoted as "area B" and "area C", respectively. "Area A" of the physical resource 5 holds "DATA_A". Similarly, "area B" and the "area C" of the physical resource 5 hold "DATA_B" and "DATA_C", respectively.

The copy destination logical volume 7 is the copy destination of data whose copy source is the copy source logical volume 6. The copy destination logical volume 7 has not received allocation of the physical resource 5 to the management unit area #3, the management unit area #4, and the management unit area #5. Upon receiving a reference command, the copy destination logical volume 7 allows reference of allocation destinations managed by management unit areas respectively having the physical resource 5 allocated thereto. Therefore, the management unit area #3 is capable of accessing "DATA_A" stored in "area A" which is the allocation destination of the management unit area #0. Similarly, the management unit area #4 and the management unit area #5 are capable of accessing "DATA_B" and "DATA_C" stored in the allocation destinations "area B" and "area C" of the management unit area #1 and the management unit area #2.

As thus described, the storage apparatus 1 allows the copy destination logical volume 7 to refer to the allocation destination managed by the management unit area of the copy source logical volume 6, in place of a copy process which involves allocation of the physical resource 5 to the copy destination logical volume 7. The storage apparatus 1 mitigates wasting of the physical resource 5 due to the copy process by performing the copy process which involves allocation of the physical resource 5 when updating data. Using such data copy (COR), the storage apparatus 1 may realize an effective use of the physical resource 5.

The storage unit 3 stores management information 8 relating to the reference destination of the management unit area of the logical volume. In addition, the storage unit 3 stores information relating to the setting of the logical volume such as the configuration of the management unit area.

Having accepted a command from the host computer 2, the control unit 4 responds in accordance with the command. One of the commands that the control unit 4 accepts from the host computer 2 is a release command. The release command is a command instructing release of the allocation of the physical resource 5 of the management unit area that the copy source logical volume 6 or the copy destination logical volume 7 includes.

Having accepted the release command, the control unit 4 releases the allocation of the physical resource 5 of the management unit area. The control unit 4 releases the allocation of the physical resource 5 of the management unit area by exchanging the reference destination of the management unit area specified by the release command with the reference destination of the specified management unit area having no physical resource allocation.

For example, when the host computer 2 has instructed release of the management unit area #2, the control unit 4 exchanges the reference destination of the management unit area #2 with the reference destination of the management unit area #5 of the copy destination logical volume 7 corresponding to the management unit area #2 of the copy source logical volume 6. The control unit 4 exchanges the management unit areas by updating management information 8a and 8c to management information 8b and 8d, respectively.

The control unit 4 specifies the reference destination of the management unit area of one of the logical volumes for exchange target, when there is no physical resource allocation to the management unit area of the other logical volume corresponding to the specified management unit area. In addition, the control unit 4 specifies, for exchange target, a reference destination of a management unit area of a logical volume (volume for exchange) separately prepared, when there is physical resource allocation to the management unit area of the other logical volume corresponding to the specified management unit area.

Since there has been no allocation of the physical resource 5 to the management unit area #5 before the release command, there will be no allocation of the physical resource 5 to the management unit area #2 due to exchange of the reference destination with the management unit area #5. On the other hand, since there has been allocation of the physical resource 5 to the management unit area #2 before the release command, the management unit area #5 receives allocation of the physical resource 5 in a state holding "DATA_C".

Accordingly, when releasing the allocation of the physical resource 5 to the management unit area of the copy source logical volume 6 (area release), the storage apparatus 1 needs to neither allocate the physical resource 5 to the management unit area of the copy destination logical volume 7 nor perform data copy. Therefore, there is no risk of resource shortage with the storage apparatus 1 when allocating a new physical resource. In addition, since the storage apparatus 1 is capable of simultaneously releasing an area and saving data of the released area by updating the management information 8, the storage apparatus 1 may quickly respond to the release command from the host computer 2.

As thus described, the storage apparatus 1 is capable of easily releasing the physical resource 5 which has become unnecessary.

Second Embodiment

Figure 2:
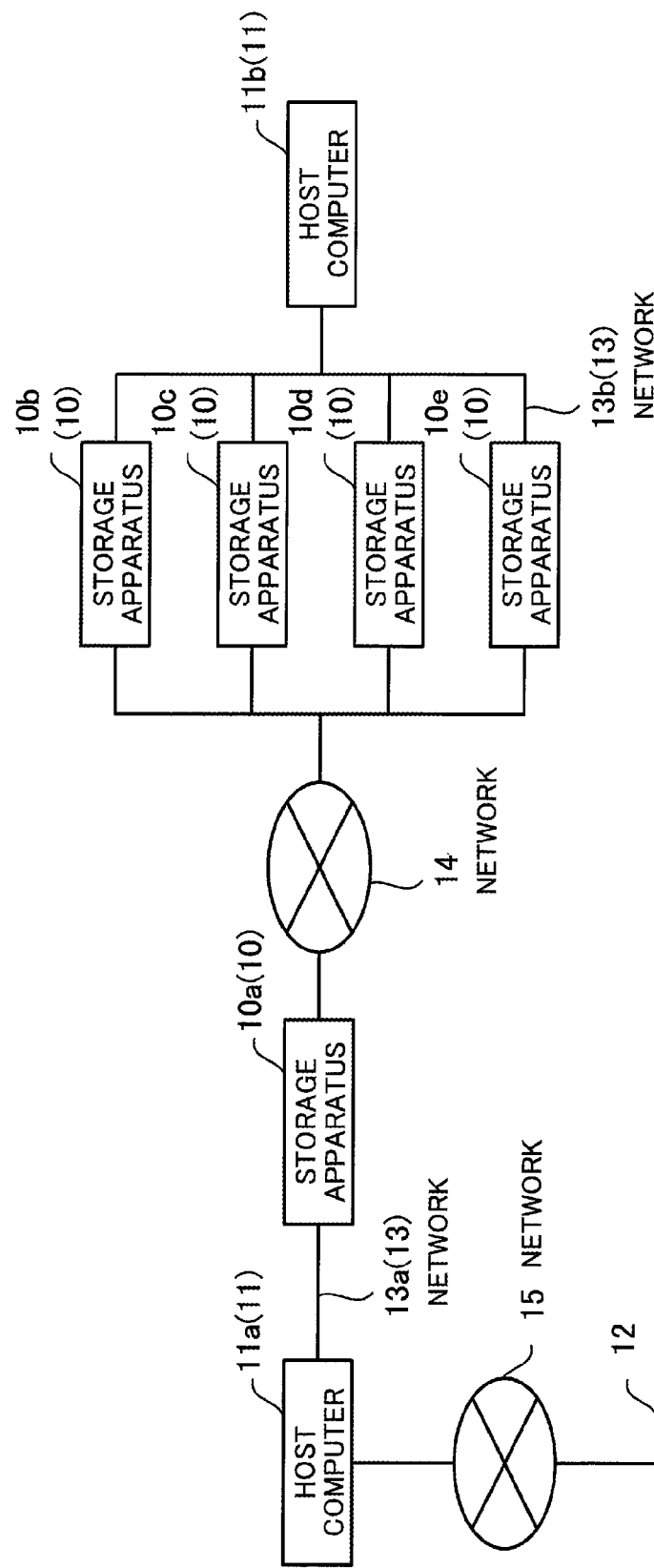
FIG. 2 illustrates an exemplary connection of a storage apparatus of a second embodiment.

Next, an exemplary connection of a storage apparatus of a second embodiment will be described, referring to FIG. 2. FIG. 2 illustrates the exemplary connection of the storage apparatus of the second embodiment.

A storage apparatus 10 is communicably connected to a host computer 11 via a network 13. The network 13 is a SAN (Storage Area Network) connecting one or more storage apparatuses 10 and one or more host computers 11.

A storage apparatus 10a is communicably connected to a host computer 11a via a network 13a, and storage apparatuses 10b, 10c, 10d, and 10e are communicably connected to a host computer 11b via a network 13b. In addition, the storage apparatuses 10a, 10b, 10c, 10d, and 10e are communicably connected to each other via a network 14. The network 14 is a network dedicated for a storage apparatus, for example.

The host computer 11a is communicably connected to an operation terminal 12 via a network 15. The network 15 is a LAN (Local Area Network) or WAN (Wide Area Network) connecting one or more host computers 11 and one or more operation terminals 12.

Figure 3:
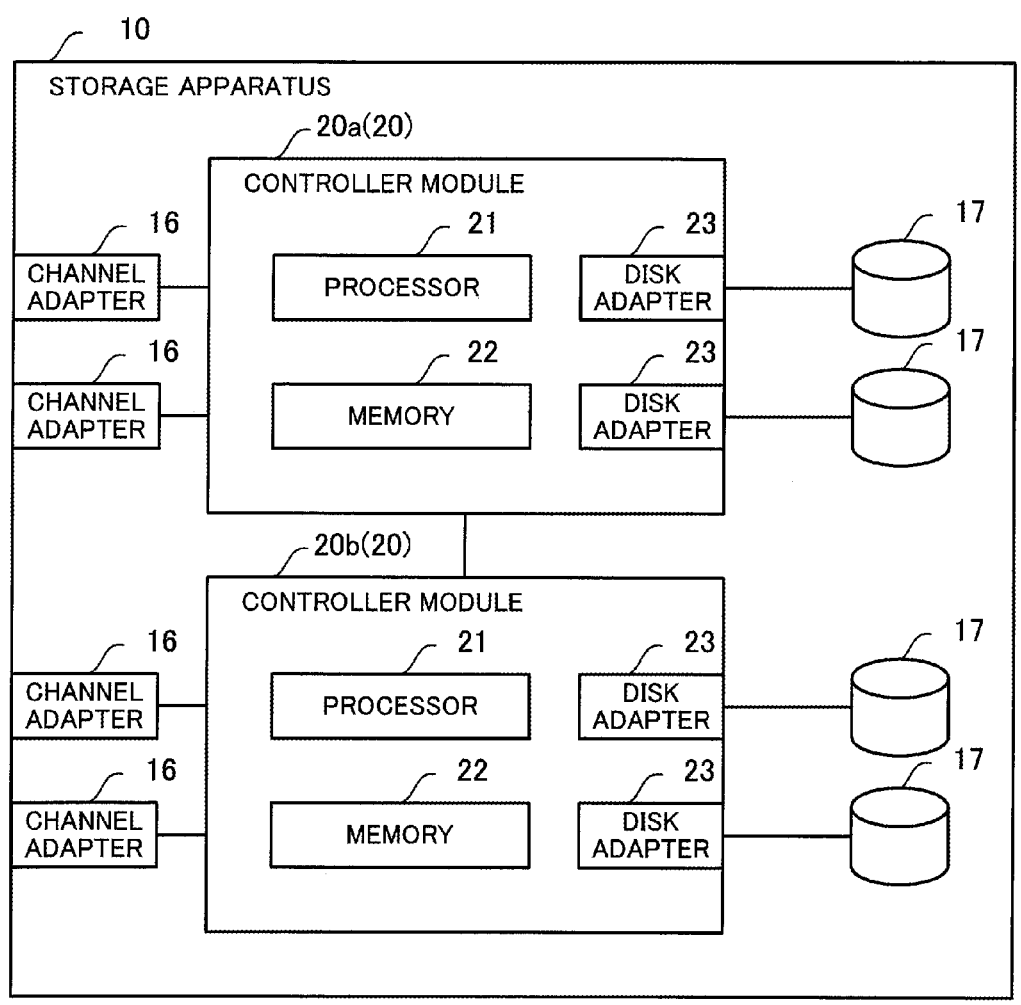
FIG. 3 illustrates an exemplary configuration of the storage apparatus of the second embodiment.

Next, the storage apparatus of the second embodiment will be described, referring to FIG. 3. FIG. 3 illustrates an exemplary configuration of the storage apparatus of the second embodiment.

The storage apparatus 10 includes channel adapters 16, controller modules 20, and storage devices 17. A plurality of the storage devices 17 constitutes a storage pool. The storage device 17 stores user data and control information.

The controller module 20 is one of the information processing apparatuses which perform access control of the storage devices 17. The access control of the storage devices 17 performed by the controller module 20 includes data transfer control in which the storage devices 17 are the data transfer source or data transfer destination, setting or releasing of logical volumes, and allocation or releasing of physical resources.

The storage apparatus 10 includes two controller modules 20; a controller module 20a and a controller module 20b. The controller module 20a and the controller module 20b are connected, via disk adapters 23, to the storage devices 17 respectively controlled by the controller module 20a and the controller module 20b. The controller module 20a and the controller module 20b are interconnected. One of the controller module 20a and the controller module 20b operates as a master and the other operates as a slave. The controller module 20 which operates as the master supervises the control of the storage apparatus 10.

The configuration of the storage apparatus 10 including two controller modules 20 is not limiting and the storage apparatus 10 may include either the controller module 20a or the controller module 20b. In addition, the storage apparatus 10a may include three or more controller modules 20, for example four or eight controller modules 20.

The storage apparatus 10 is connected to the host computer 11 via channel adapters 16. The channel adapters 16 are provided to each of the controller modules 20. The controller modules 20 may be connected to the host computer 11 via a plurality of systems by a plurality of the channel adapters 16.

The controller module 20 includes a processor 21, a memory 22, and the disk adapters 23. The processor 21 performs transfer control, area allocation control, area release control, or the like.

The memory 22 holds data when the data is read from the storage device 17, and also operates as a buffer when writing data into the storage device 17. In addition, the memory 22 stores user data and control information. The disk adapter 23 performs interface control (access control) with the storage device 17.

The controller module 20 is controlled as a whole by the processor 21. The processor 21 has the memory 22 connected thereto via a bus (not illustrated). In addition, to the processor 21, a peripheral device (not illustrated) is connected or may be connected via a bus (not illustrated). The processor 21, which is an exemplary processor, may be an MPU (Micro Processing Unit), a DSP (Digital Signal Processor), an ASIC (Application Specific Integrated Circuit), or a PLD (Programmable Logic Device), for example. In addition, the processor 21, without being limited to a single processor, may be a multiprocessor. In addition, the processor 21 may be a combination of two or more components of a CPU, an MPU, a DSP, an ASIC, and a PLD.

The memory 22 includes a RAM (Random Access Memory) and a nonvolatile memory. The RAM is used as the main memory of the controller module 20. The RAM has temporarily stored therein at least a part of programs of the OS (Operating System), firmware, and application programs to be executed by the processor 21. In addition, the RAM has stored therein various data desired for processing by the processor 21.

The nonvolatile memory holds the stored content at the time of power-off of the storage apparatus 10. The nonvolatile memory is a semiconductor storage device such as an EEPROM (Electronically Erasable and Programmable Read Only Memory) or a flash memory, or an HDD, for example. In addition, the nonvolatile memory is used as an auxiliary storage device of the controller module 20. The nonvolatile memory has stored therein programs of the OS, firmware, application programs, and various data.

Peripheral devices connected to the bus include an input-and-output interface and a communication interface.

The input-and-output interface is connected to input-and-output devices such as an HDD to perform input-and-output. The input-and-output interface transmits, to the processor 21 and a cache memory (memory 22), signals and data which are sent from a storage device such as an HDD. In addition, the input-and-output interface outputs, for example, a signal received from the processor 21 to another control unit, or an output device connected to the controller module 20.

The communication interface transmits and receives data to and from the other controller modules 20 in the storage apparatus 10.

With the hardware configuration described above, the processing function of the controller module 20 of the second embodiment may be realized. Besides the host computer 11, the storage apparatus 1 illustrated in the first embodiment may also be realized by hardware similar to the controller module 20.

Figure 4:
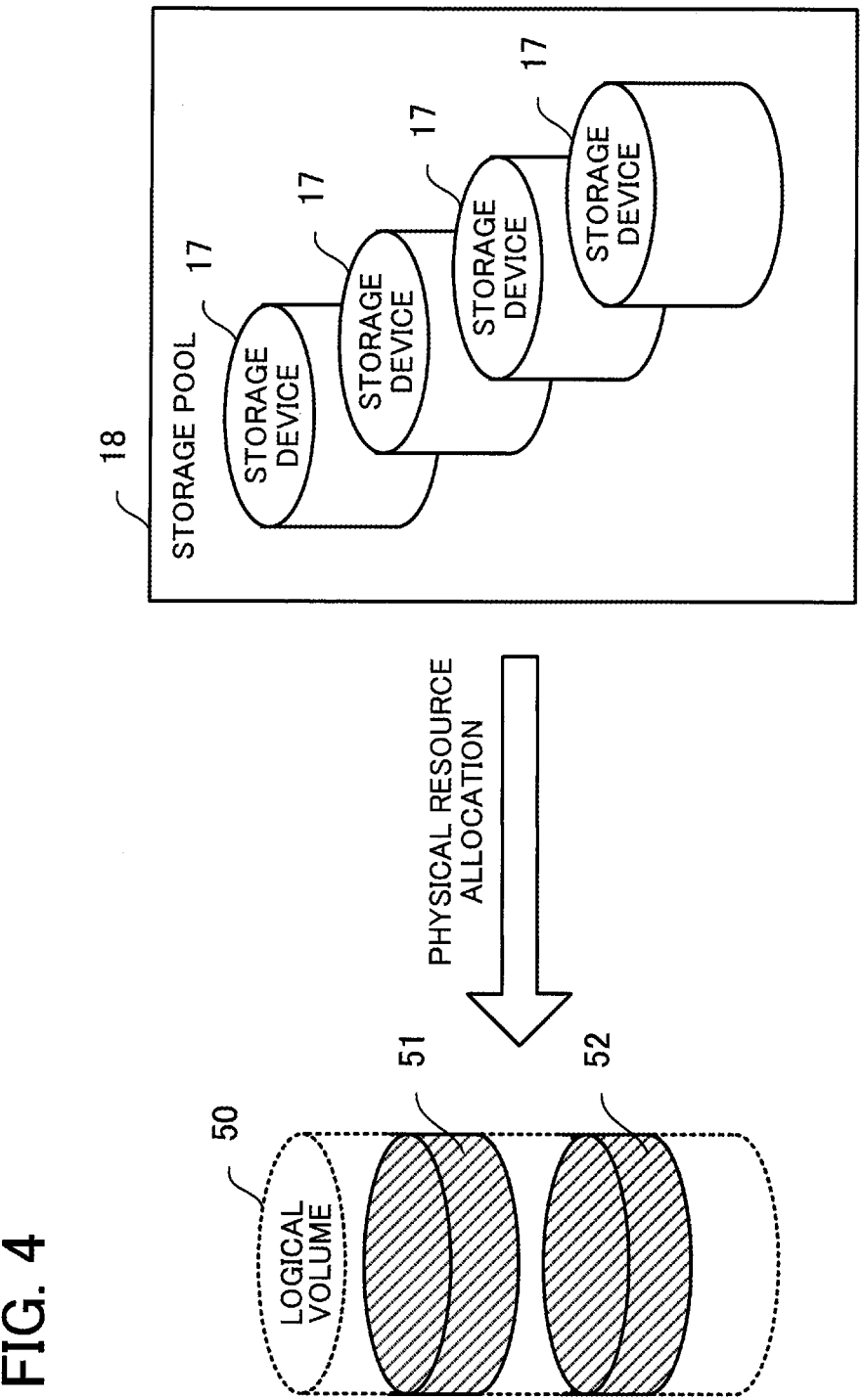
FIG. 4 illustrates physical resource allocation to a logical volume of the second embodiment.

Next, area allocation (physical resource allocation) and area releasing (physical resource releasing) of the second embodiment will be described, referring to FIGS. 4 and 5. FIG. 4 illustrates physical resource allocation to the logical volume of the second embodiment.

The storage apparatus 10 has the thin provisioning function which is capable of setting a virtually available capacity, regardless of the physical capacity of the storage device 17. The storage apparatus 10 causes the host computer 11 to recognize a logical volume 50 which is a virtual volume. Upon issuing of a write I/O from the host computer 11, the storage apparatus 10 performs physical resource allocation (area allocation) to allocate a storage resource from a storage pool 18 to the logical volume 50. The storage pool 18 is a unit of managing a plurality of the storage apparatuses 17 by the storage apparatus 10. For example, upon accepting a write I/O for areas 51 and 52, the logical volume 50 illustrated in FIG. 4 receives physical resource allocation from the storage pool 18.

Figure 5:
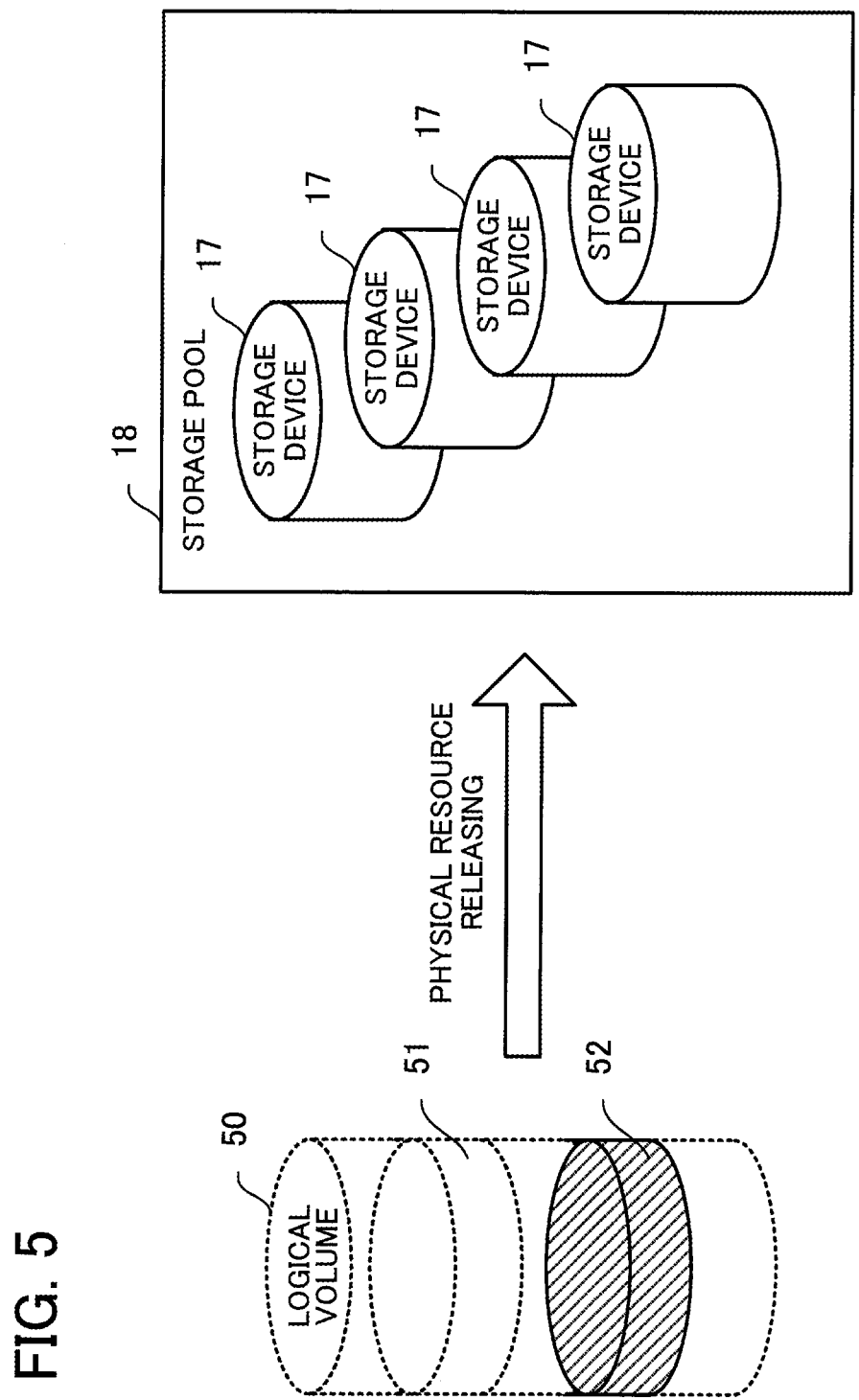
FIG. 5 illustrates releasing of a physical resource from the logical volume of the second embodiment.

FIG. 5 illustrates a physical resource release from the logical volume of the second embodiment. The storage apparatus 10 may issue an "UNMAP" (area release) command to an area which has become unused after the physical resource allocation to release the physical resource. The "UNMAP" command is a command for releasing the physical resource of the area which has become unnecessary in a filing system. For example, the logical volume 50 illustrated in FIG. 5 issues an "UNMAP" command to the area 51 which has become unused to release the physical resource, and returns the physical resource to the storage pool 18.

The storage apparatus 10 is capable of performing allocation and releasing of physical resources for each predetermined area (management unit area). The logical volume 50 may be divided into minimum unit volumes referred to as TPPS (Thin Provisioning Pool Slice), and the storage apparatus 10 is capable of allocation and releasing of physical resources for each TPPS. Each of the areas 51 and 52 is TPPS.

Figure 6:
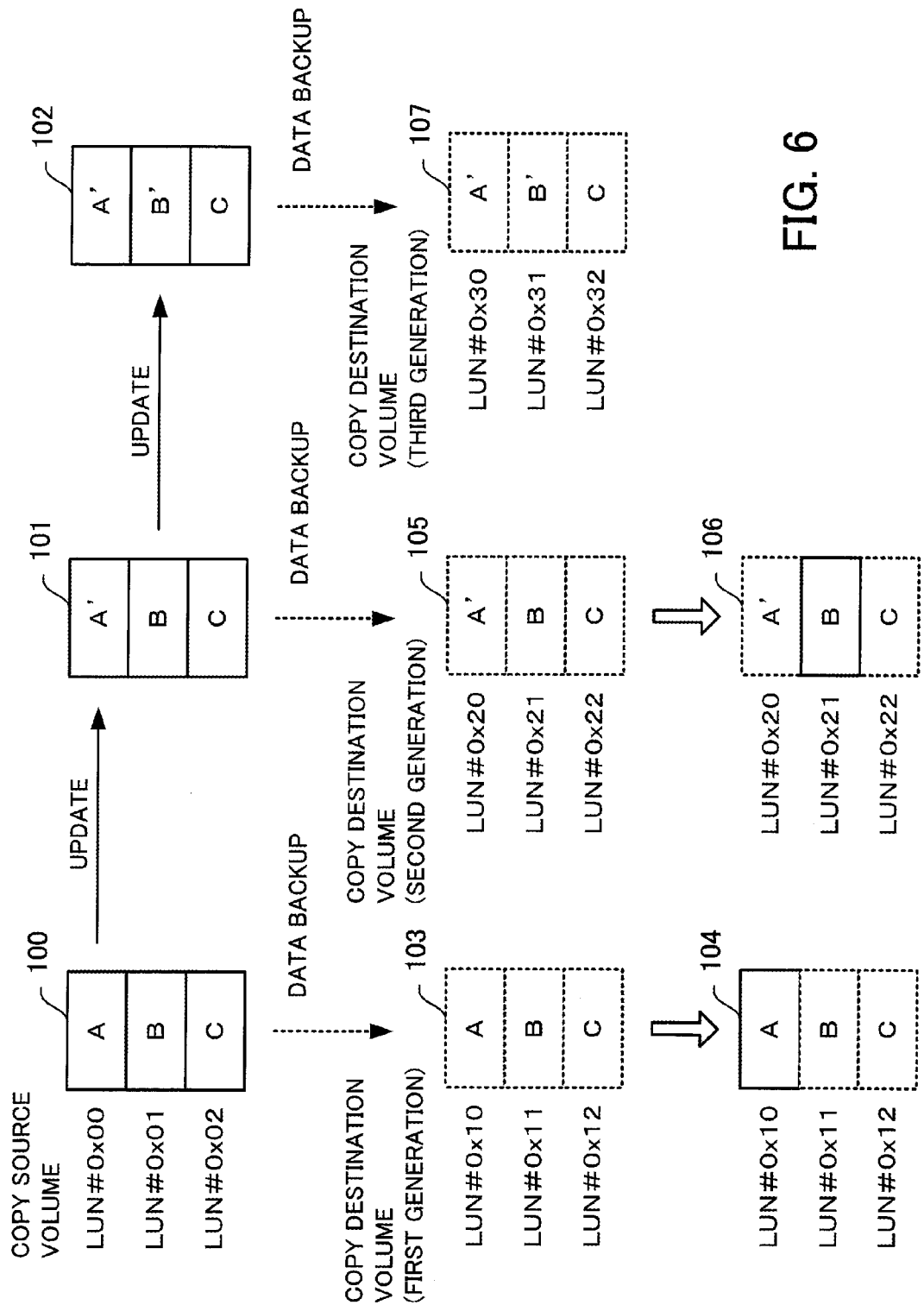
FIG. 6 illustrates a generation backup scheme using a copy-on-write method of the second embodiment.

Next, a data backup method using the copy-on-write method of the second embodiment will be described, referring to FIG. 6. FIG. 6 illustrates a generation backup scheme using the copy-on-write method of the second embodiment.

The copy-on-write method performs data backup using a logical volume which is a virtual volume as the copy destination volume. The data backup scheme, which does not involve copying of data, effects an apparent backup by merely allowing the copy destination to refer to the data in the copy source.

A copy source volume (logical volume which is a virtual volume) 100 has three TPPSs; a TPPS(LUN#0x00), a TPPS (LUN#0x01), and a TPPS(LUN#0x02). The TPPS (LUN#0x00) holds data "A", the TPPS(LUN#0x01) holds data "B", and the TPPS(LUN#0x02) holds data "C".

Here, "LUN#0x00", "LUN#0x01", and "LUN#0x02" are identification information referred to as Logical Unit Numbers (LUN) that allows unique identification of a TPPS in the storage pool 18. Using logical unit numbers, the host computer may identify a TPPS to access the logical volume.

A copy destination volume (logical volume which is a virtual volume) 103 has three TPPSs; a TPPS(LUN#0x10), a TPPS(LUN#0x11), and a TPPS(LUN#0x12). Owing to data backup based on the copy-on-write method with the copy source volume 100 being the copy source and the copy destination volume 103 being the copy destination, the copy destination volume 103 completes the backup by only setting the copy source volume 100 as the data reference destination without receiving physical resource allocation and copying data. Accordingly, the copy destination volume 103 becomes the first generation backup of the copy source volume 100.

Thus, the TPPS(LUN#0x10), the TPPS(LUN#0x11), and the TPPS(LUN#0x12) apparently hold data "A", data "B", and data "C", respectively.

The storage apparatus 10 has mapping information associating a logical unit number with allocation of a physical resource thereof, a reference destination thereof, and the like. The storage apparatus 10 holds the mapping information in the memory 22. The host computer is capable of accessing specific data, referring to the mapping information.

Here, when updating data "A" held by the TPPS (LUN#0x00) of the copy source volume 100 to data "A'", the copy destination volume 103 allocates a physical resource to the TPPS(LUN#0x10) to hold data "A" therein so as not to lose data "A" (copy destination volume 104). The copy source volume 100 is updated to a copy source volume 101 after the copy destination volume 103 has been updated to the copy destination volume 104.

A copy destination volume 105 has three TPPSs; a TPPS (LUN#0x20), a TPPS(LUN#0x21), and a TPPS (LUN#0x22). The copy destination volume 103 becomes the second generation backup of the copy source volume 101 by data backup according to the copy-on-write method. The TPPS(LUN#0x20), the TPPS(LUN#0x21), and the TPPS (LUN#0x22) apparently hold data "A", data "B", and data "C", respectively.

Here, the copy destination volume 105 allocates a physical resource to the TPPS(LUN#0x21) to hold data "B" therein (copy destination volume 106) when updating data "B" held by the TPPS(LUN#0x01) of the copy source volume 101 to data "B'". The copy source volume 101 is updated to a copy source volume 102 after the copy destination volume 105 has been updated to the copy destination volume 106.

In addition, the TPPS(LUN#0x11) of the copy destination volume 104 refers to data "B" held by the physical resource allocated to the TPPS(LUN#0x21). A copy destination volume 107 has three TPPSs; a TPPS(LUN#0x30), a TPPS (LUN#0x31), and a TPPS(LUN#0x32). The copy destination volume 107 becomes the third generation backup of the copy source volume 102 by data backup according to the copy-on-write method.

As thus described, the storage apparatus 10 realizes data backup using basic physical resources by copying data only in the area where the copy source volume has been updated. In addition, the storage apparatus 10 is capable of managing backup data of the copy source volume for each generation.

Next, a physical resource area releasing method of the second embodiment will be described, for a case of performing area releasing of the copy source volume and a case of performing area releasing of the copy destination volume.

[Area Releasing 1 of Copy Source Volume]

Figure 7:
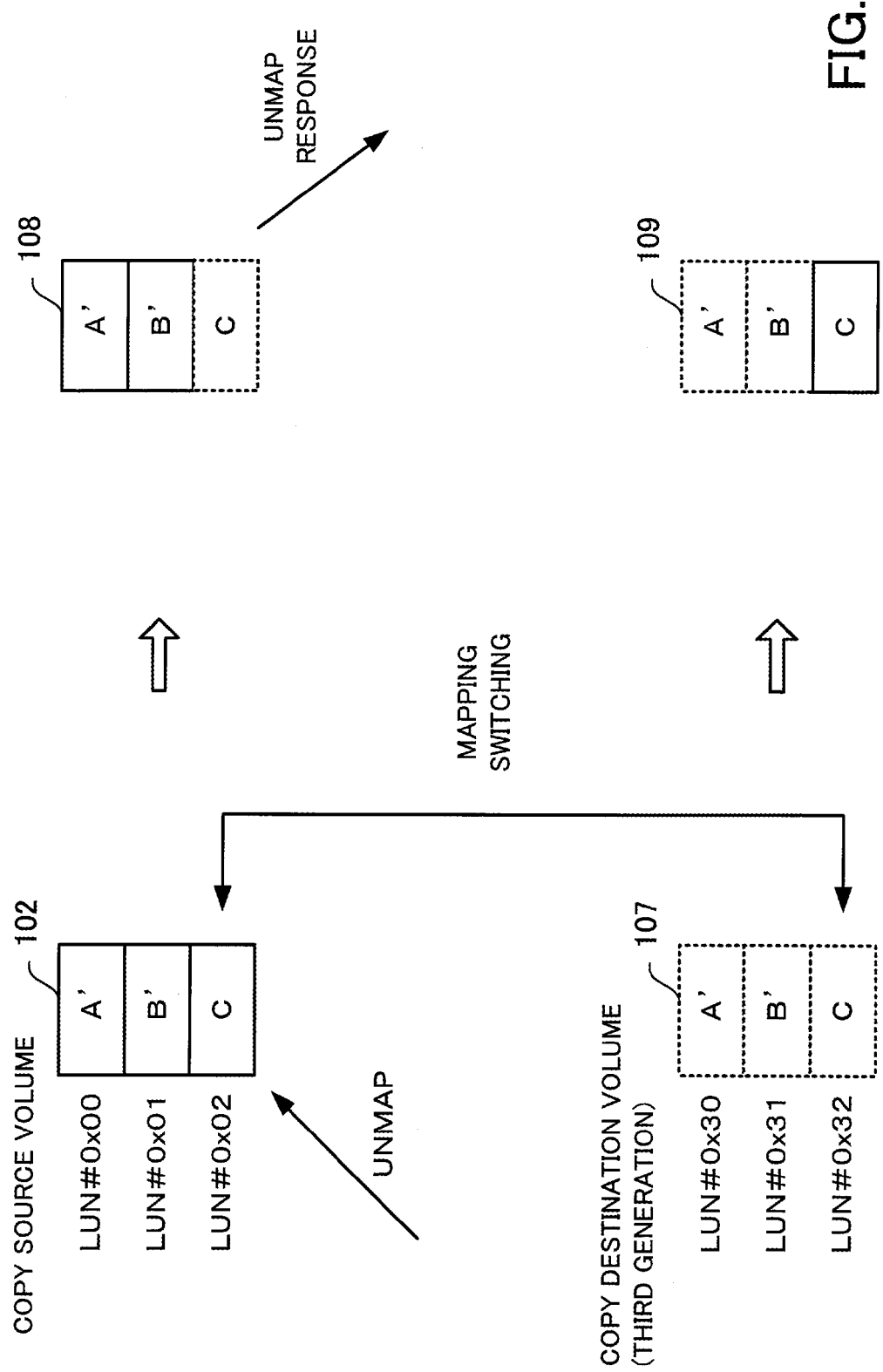
FIG. 7 illustrates an exemplary area releasing for a copy source volume of the second embodiment.

First, area releasing of a copy source volume will be described. FIG. 7 illustrates an exemplary area releasing of the copy source volume of the second embodiment.

A case will be described in which the storage apparatus 10 accepts, from the host computer 11, an UNMAP command (area release command) for the TPPS(LUN#0x02) of the copy source volume 102.

The storage apparatus 10 switches mapping of the TPPS (LUN#0x02) of the copy source volume 102 and mapping of the TPPS(LUN#0x32) of the copy destination volume 107. Mapping, which is information relating to a reference destination of a TPPS, includes information (e.g., physical address) capable of identifying a physical resource allocated to a TPPS. Accordingly, in the copy source volume 102, a physical resource which has been allocated to the TPPS (LUN#0x02) is released (copy source volume 108). In addition, the copy destination volume 107 receives physical resource allocation to the TPPS(LUN#0x32) and holds data "C" in the allocated physical resource (copy destination volume 109).

In order to prevent copy operation in the range of the TPPS(LUN#0x02) after switching of mappings, the storage apparatus 10 updates control information (control information (bitmap) used for determining completion/non-completion of copy) for managing the progress of copy, and sets the copy operation status in the range of the TPPS(LUN#0x02) as "completed".

The storage apparatus 10 reports, to the host computer 11, completion of UNMAP for the TPPS(LUN#0x02) of the copy source volume 102 (UNMAP response).

Figure 8:
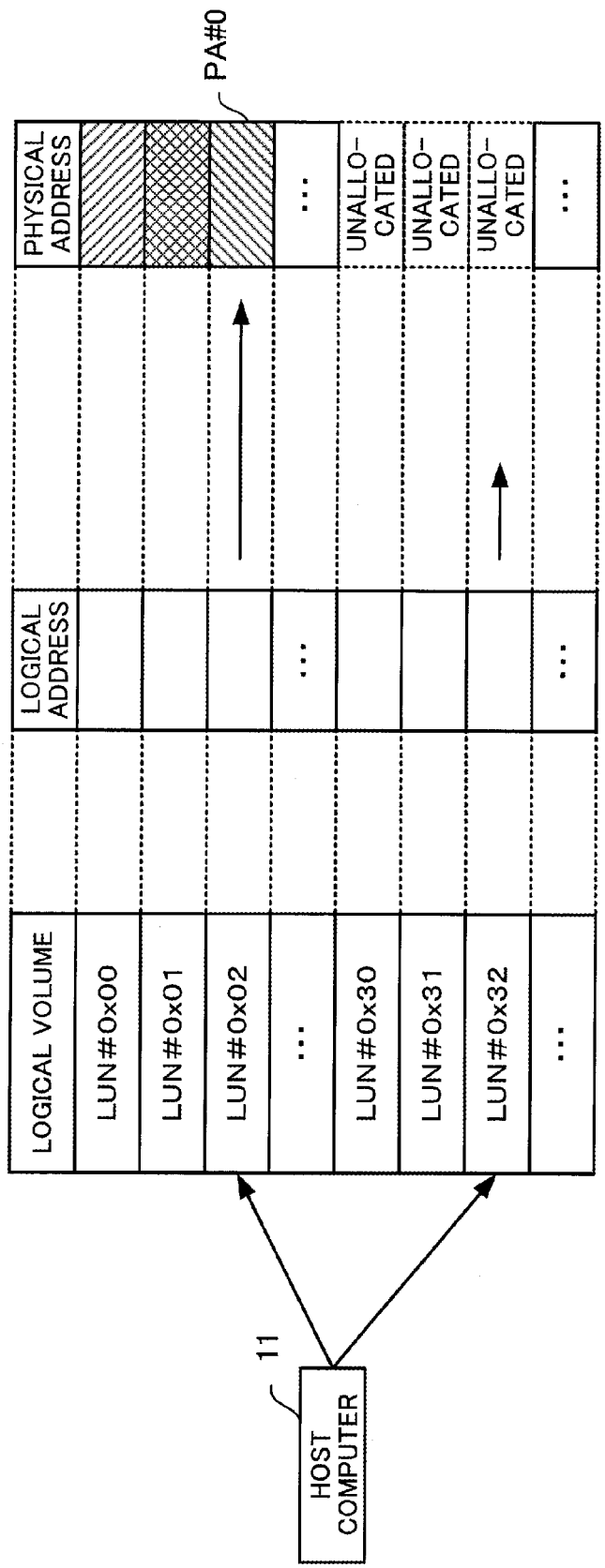
FIG. 8 illustrates a physical address reference before performing UNMAP in a TPPS illustrated in FIG. 7.

Now, switching between physical address references before and after performing UNMAP illustrated in FIG. 7 will be described, referring to FIGS. 8 and 9. FIG. 8 illustrates a physical address reference before performing UNMAP in the TPPS illustrated in FIG. 7.

The TPPS(LUN#0x02) subjected to UNMAP has physical resource allocation and is referring to a physical address "PA #0". The TPPS(LUN#0x32) has no physical resource allocation and thus has no physical address to refer to.

Figure 9:
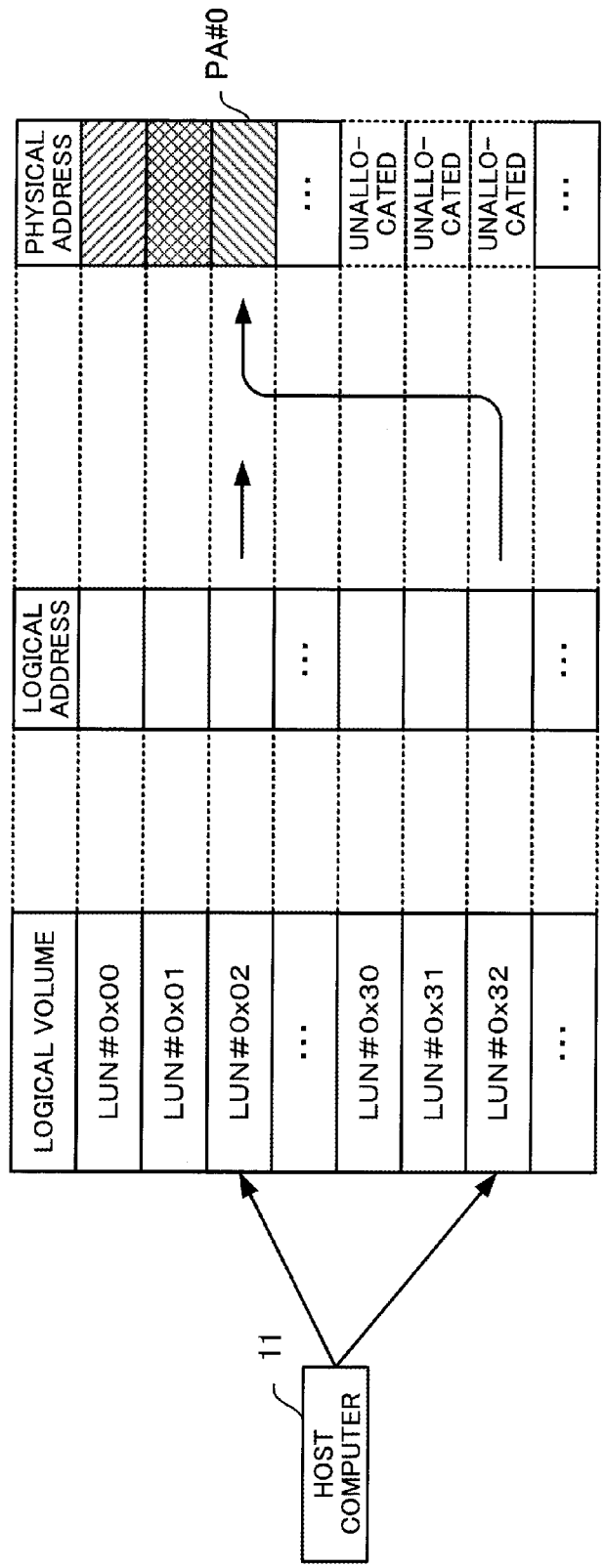
FIG. 9 illustrates a physical address reference after having performed UNMAP in the TPPS illustrated in FIG. 7.

FIG. 9 illustrates a physical address reference after having performed UNMAP in the TPPS illustrated in FIG. 7.

The TPPS(LUN#0x02) subjected to UNMAP has exchanged its reference destination with the TPPS (LUN#0x32) and thus has no physical address to refer to. The TPPS(LUN#0x32) has exchanged its reference destination with the TPPS(LUN#0x02) and thus is referring to a physical address "PA #0".

As thus described, the TPPS(LUN#0x02) has lost allocation of the physical resource, and thus may be regarded to have released allocation of the physical resource. In addition, the TPPS(LUN#0x32), being allowed to refer to the physical address "PA #0", may be regarded to have received allocation of the physical resource. In addition, since the physical address "PA #0" holds data, data copy becomes unnecessary in comparison with the case of newly receiving allocation of the physical resource. Therefore, the storage apparatus 10 is capable of quickly providing an UNMAP response to the host computer 11.

[Area Releasing 2 of Copy Source Volume]

Figure 10:
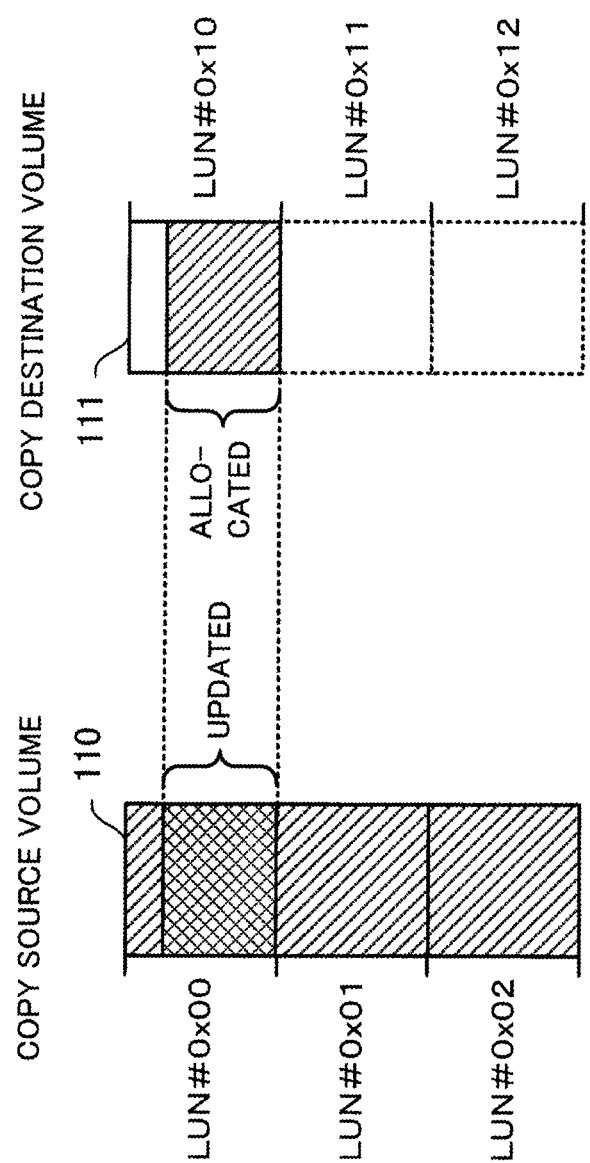
FIG. 10 illustrates a copy source volume and a copy destination volume when data is updated in the TPPS subjected to UNMAP.
Figure 11:
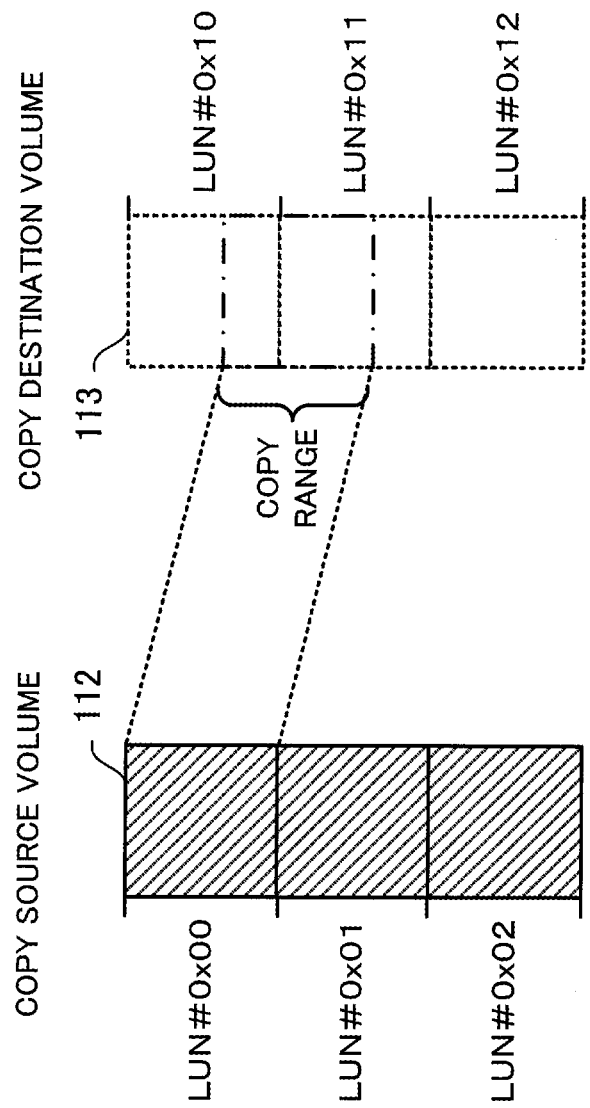
FIG. 11 illustrates a copy source volume and a copy destination volume when a range of a copy destination of a TPPS subjected to UNMAP lies across a plurality of TPPSs.

Next, a case will be described in which it is impossible to simply switch a mapping of a TPPS of a copy source volume and a mapping of a TPPS of a copy destination volume, referring to FIGS. 10 and 11. One case in which it is impossible to simply switch mappings of TPPSs is such that there has been updating of data in a TPPS subjected to UNMAP. FIG. 10 illustrates a copy source volume and a copy destination volume when there has been updating of data in a TPPS subjected to UNMAP.

When there has been updating of data in the TPPS (LUN#0x00) of a copy source volume 110 and the data before the updating is backed up in the TPPS(LUN#0x10) of a copy destination volume 111, the TPPS(LUN#0x10) has already received physical resource allocation. Therefore, it is impossible to perform area releasing of the TPPS (LUN#0x00) by simply switching the mapping of the TPPS (LUN#0x00) and the mapping of the TPPS(LUN#0x10).

In addition, another case in which it is impossible to simply switch mapping of TPPSs is such that the range of the copy destination of the TPPS subjected to UNMAP lies across a plurality of TPPSs. FIG. 11 illustrates a copy source volume and a copy destination volume when a range of a copy destination of a TPPS subjected to UNMAP lies across a plurality of TPPSs.

When a copy range corresponding to the TPPS (LUN#0x00) of a copy source volume 112 lies across a plurality of TPPSs of the copy destination volume 111, the storage apparatus 10 is incapable of determining a TPPS of a copy destination volume 113 to be subjected to mapping switching. It is impossible for the storage apparatus 10 to determine either the TPPS(LUN#0x10) or the TPPS (LUN#0x11) to which the mapping of the TPPS (LUN#0x00) is switched.

Figure 12:
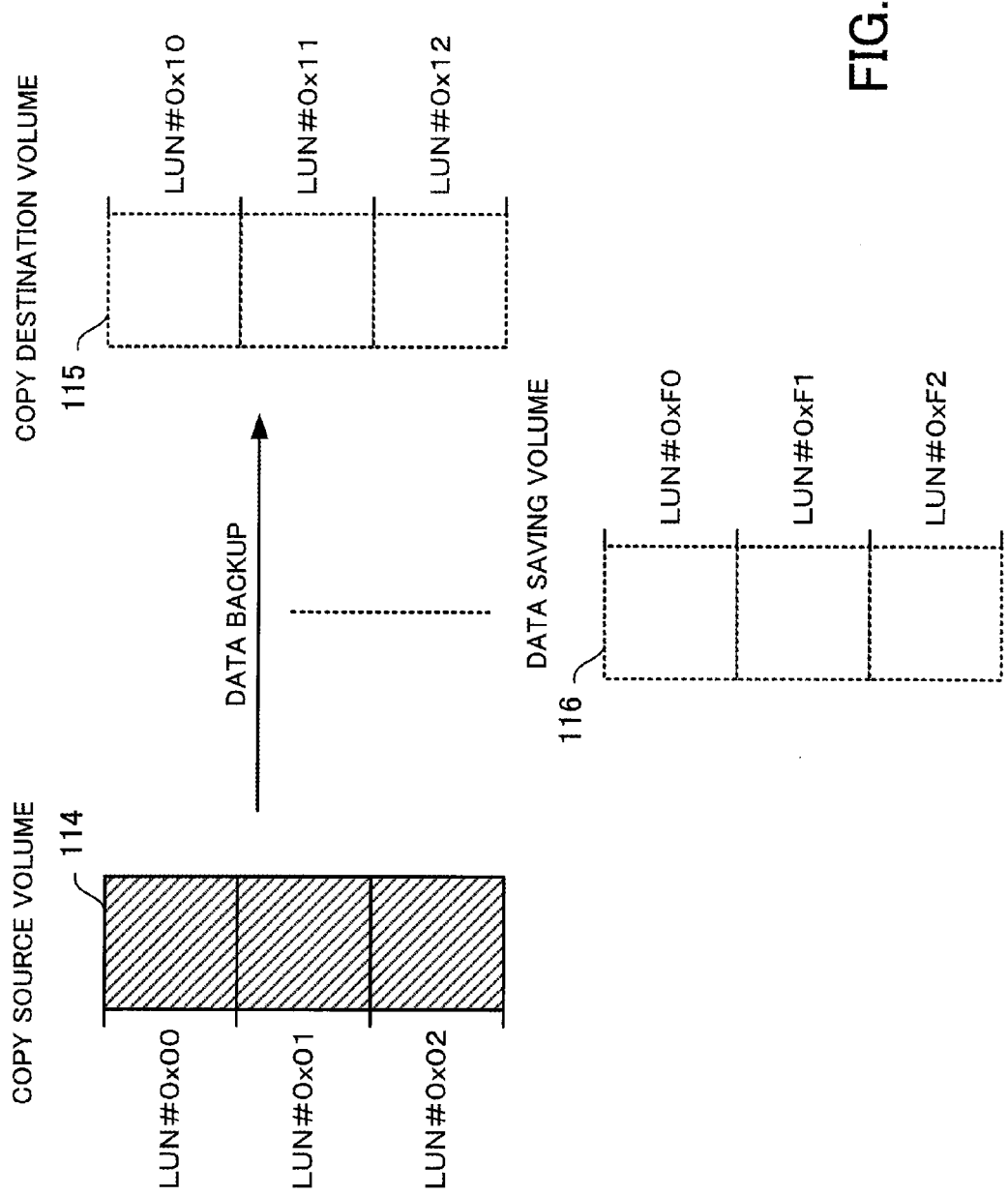
FIG. 12 illustrates a copy source volume, a copy destination volume, and a data saving volume at the time of starting data backup.

Therefore, the storage apparatus 10 allows a quick UNMAP response by preparing a data saving volume for temporarily saving data. Area releasing of a copy source volume using a data saving volume will be described, referring to FIGS. 12 to 16. FIG. 12 illustrates a copy source volume, a copy destination volume, and a data saving volume at the time of starting data backup.

The storage apparatus 10 prepares a data saving volume when starting data backup (data backup using the copy-on-write method) of a copy source volume. The size of the data saving volume is the same as that of the copy source volume.

The storage apparatus 10 performs backup of a copy source volume 114 at any timing. For example, backup of the copy source volume 114 may be periodically performed, or may be performed with a predetermined process, an instruction from a user or the like as a trigger.

The storage apparatus 10 prepares a data saving volume 116 when starting backup from the copy source volume 114 to the copy destination volume 115. The copy source volume 114 has the TPPS(LUN#0x00), the TPPS(LUN#0x01), and the TPPS(LUN#0x02), each of which has received physical resource allocation. The copy destination volume 115 has the TPPS(LUN#0x10), the TPPS(LUN#0x11), and the TPPS (LUN#0x12), each of which has not yet received physical resource allocation. The data saving volume 116 has TPPS (LUN#0xF0), TPPS(LUN#0xF1), and TPPS(LUN#0xF2), each of which has not yet received physical resource allocation.

Figure 13:
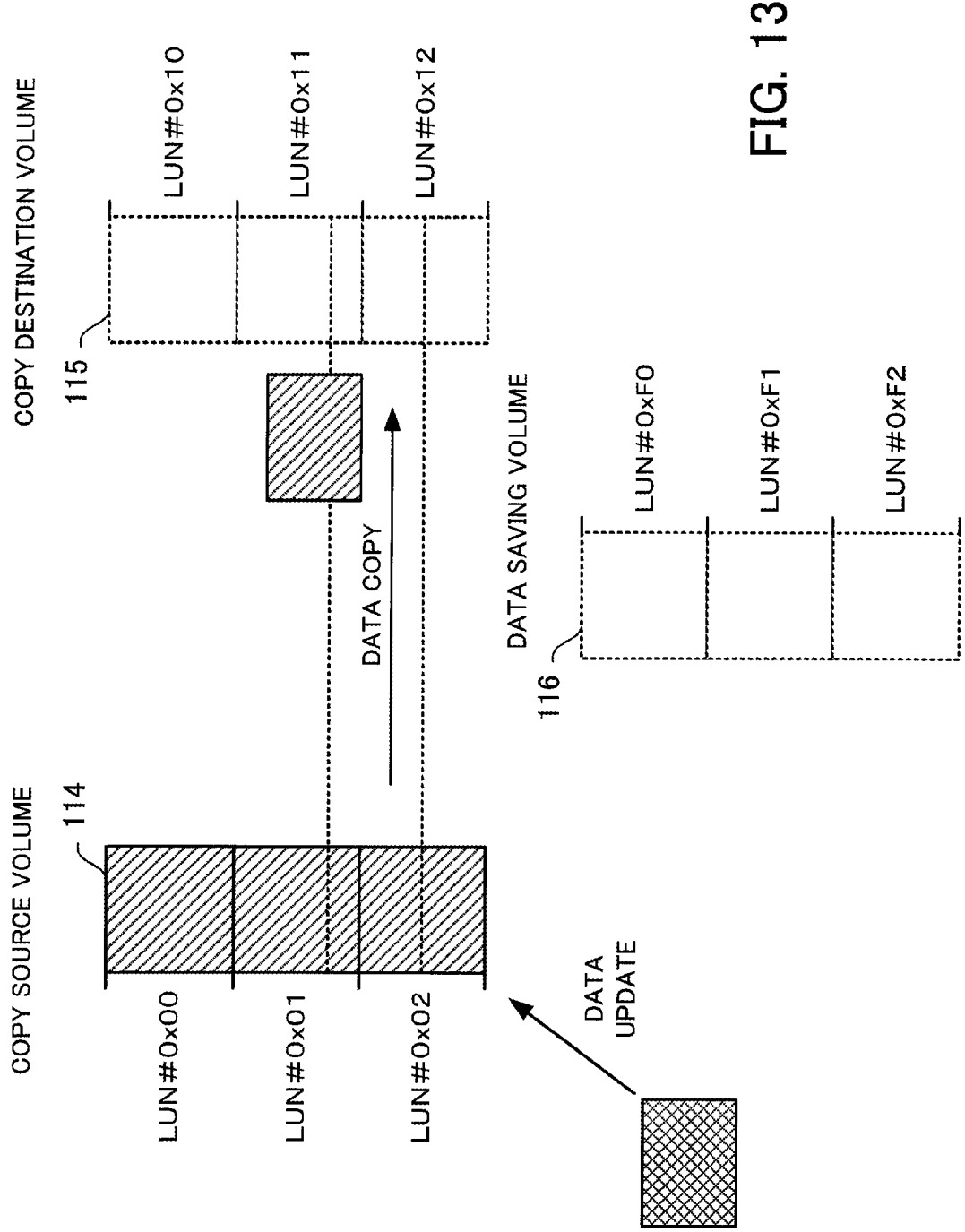
FIG. 13 illustrates a copy source volume, a copy destination volume, and a data saving volume after having accepted and before performing data updating of the IPPS of the copy source volume.

Here, it is assumed that the storage apparatus 10 has accepted data updating (write I/O) of an area lying across the TPPS(LUN#0x01) and the TPPS(LUN#0x02) of the copy source volume 114. FIG. 13 illustrates a copy source volume, a copy destination volume, and a data saving volume after having accepted and before performing data updating of the TPPS of the copy source volume. The storage apparatus 10 allocates physical resources to the TPPS (LUN#0x11) and the TPPS(LUN#0x12), and copies the data before updating.

Figure 14:
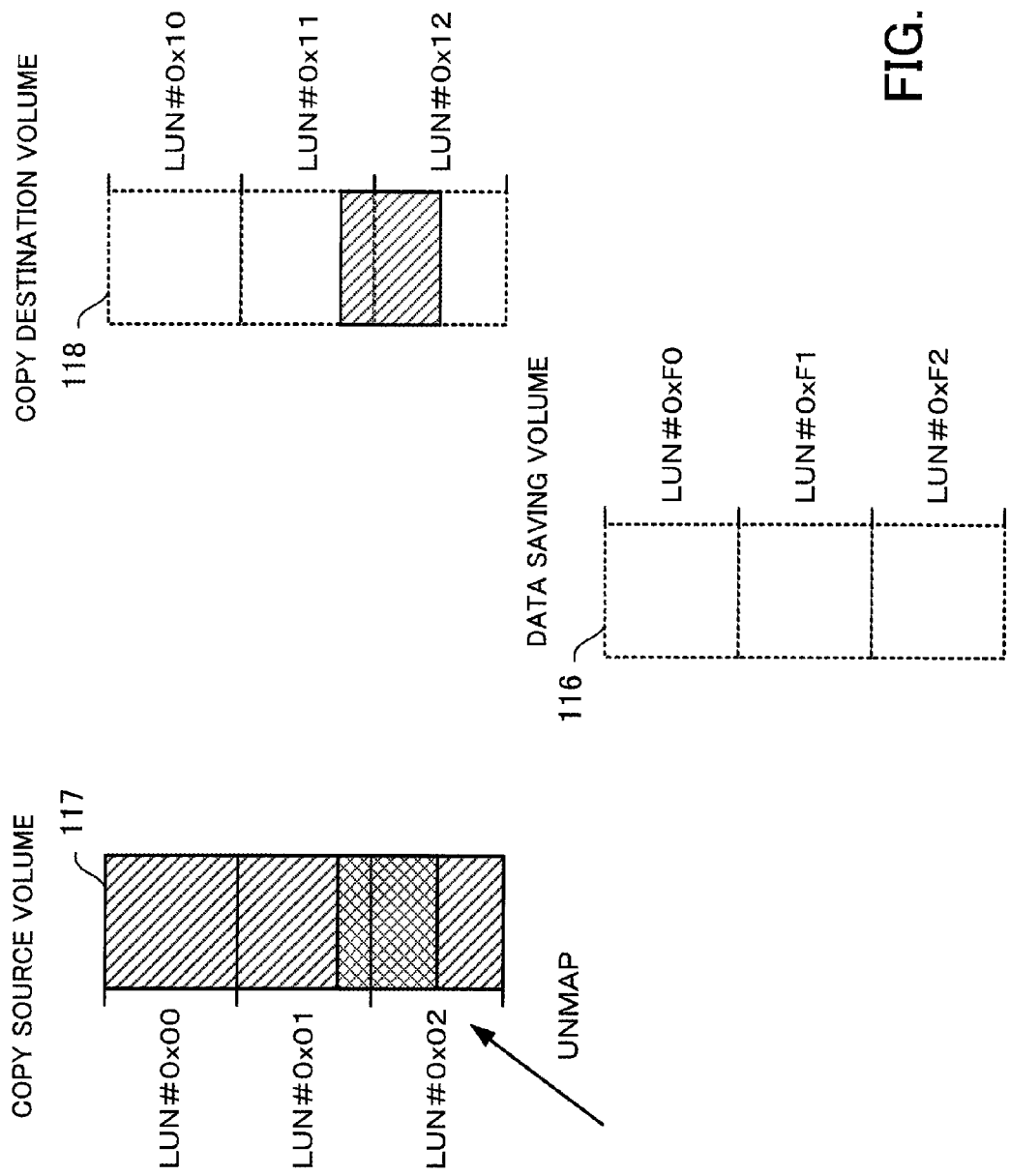
FIG. 14 illustrates a copy source volume, a copy destination volume, and a data saving volume, after having performed data updating of the TPPS of the copy source volume.

FIG. 14 illustrates a copy source volume, a copy destination volume, and a data saving volume after having performed data updating of the TPPS of the copy source volume. A copy source volume 117 is the result of data updating of the copy source volume 114. A copy destination volume 118 is the result of copying data to the copy destination volume 115.

Now, the storage apparatus 10 accepts, from the host computer 11, an UNMAP command for the TPPS (LUN#0x12) of the copy source volume 117. With regard to the UNMAP command accepted in such a situation, it is impossible for the storage apparatus 10 to perform area releasing of the TPPS(LUN#0x02) by simply switching the mappings of the TPPS(LUN#0x12) and the TPPS (LUN#0x12).

Figure 15:
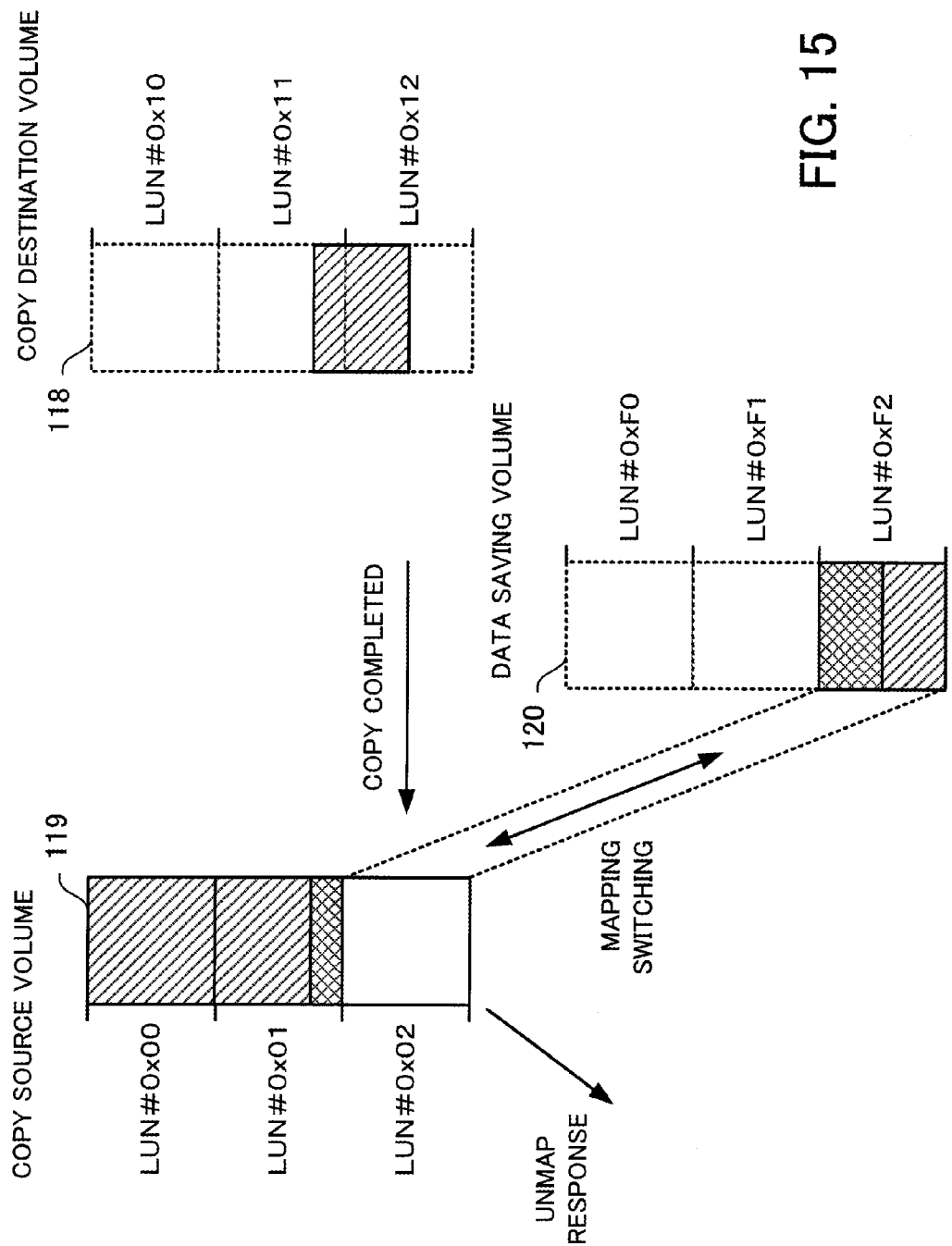
FIG. 15 illustrates a copy source volume, a copy destination volume, and a data saving volume after having saved data of the TPPS of the copy source volume into the data saving volume.

Therefore, the storage apparatus 10 performs area releasing of the TPPS(LUN#0x02) by saving data of the TPPS (LUN#0x02) to the data saving volume 116. FIG. 15 illustrates a copy source volume, a copy destination volume, and a data saving volume after having saved the data of the TPPS of the copy source volume to the data saving volume.

The storage apparatus 10 switches the mapping of the TPPS(LUN#0x02) of the copy source volume 114 and the mapping of the TPPS(LUN#0xF2) of the data saving volume 116. As a result, the copy source volume 114 turns into a copy source volume 119, and the physical resource which has been allocated to the TPPS(LUN#0x02) is released. In addition, the data saving volume 116 receives physical resource allocation to the TPPS(LUN#0xF2) and holds, in the allocated physical resource, the data which has been held in the copy source volume 114.

In order to prevent copy operation in the range of the TPPS(LUN#0x02) after mapping switching, the storage apparatus 10 updates the control information for managing the progress of copy, and sets the copy operation status in the range of the TPPS(LUN#0x02) as "completed".

The storage apparatus 10 reports, to the host computer 11, completion of UNMAP for the TPPS(LUN#0x02) of the copy source volume 102 (UNMAP response).

Figure 16:
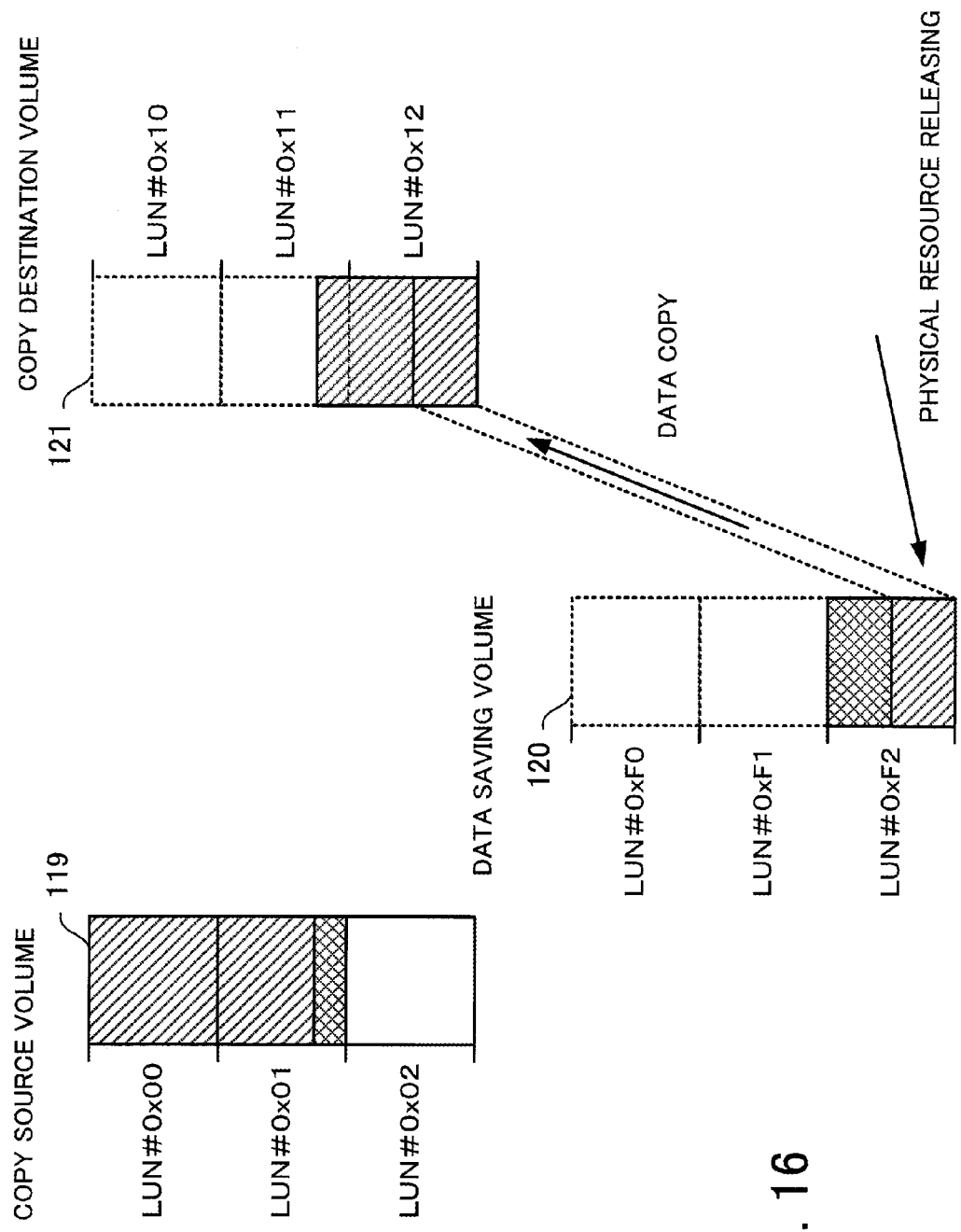
FIG. 16 illustrates a copy source volume, a copy destination volume, and a data saving volume after completion of UNMAP has been reported.

Subsequently, the storage apparatus 10 copies, to a copy destination volume, the data which has been saved into the data saving volume 116. FIG. 16 illustrates a copy source volume, a copy destination volume, and a data saving volume after completion of UNMAP has been reported.

The storage apparatus 10 copies, among the data saved in the TPPS(LUN#0xF2) of the data saving volume 116, copy-uncompleted data to the TPPS(LUN#0x12) of a copy destination volume 121. The storage apparatus releases the physical resource which has been allocated to the TPPS (LUN#0xF2) of the data saving volume 116 after having completed copying.

As thus described, the storage apparatus 10 is capable of copying data which has been saved asynchronously with the UNMAP response, and releasing the physical resource of the data saving volume 116. Therefore, the storage apparatus 10 is capable of quickly providing a response to the host computer 11 without causing a command time-out even if it takes time to copy the saved data.

Figure 17:
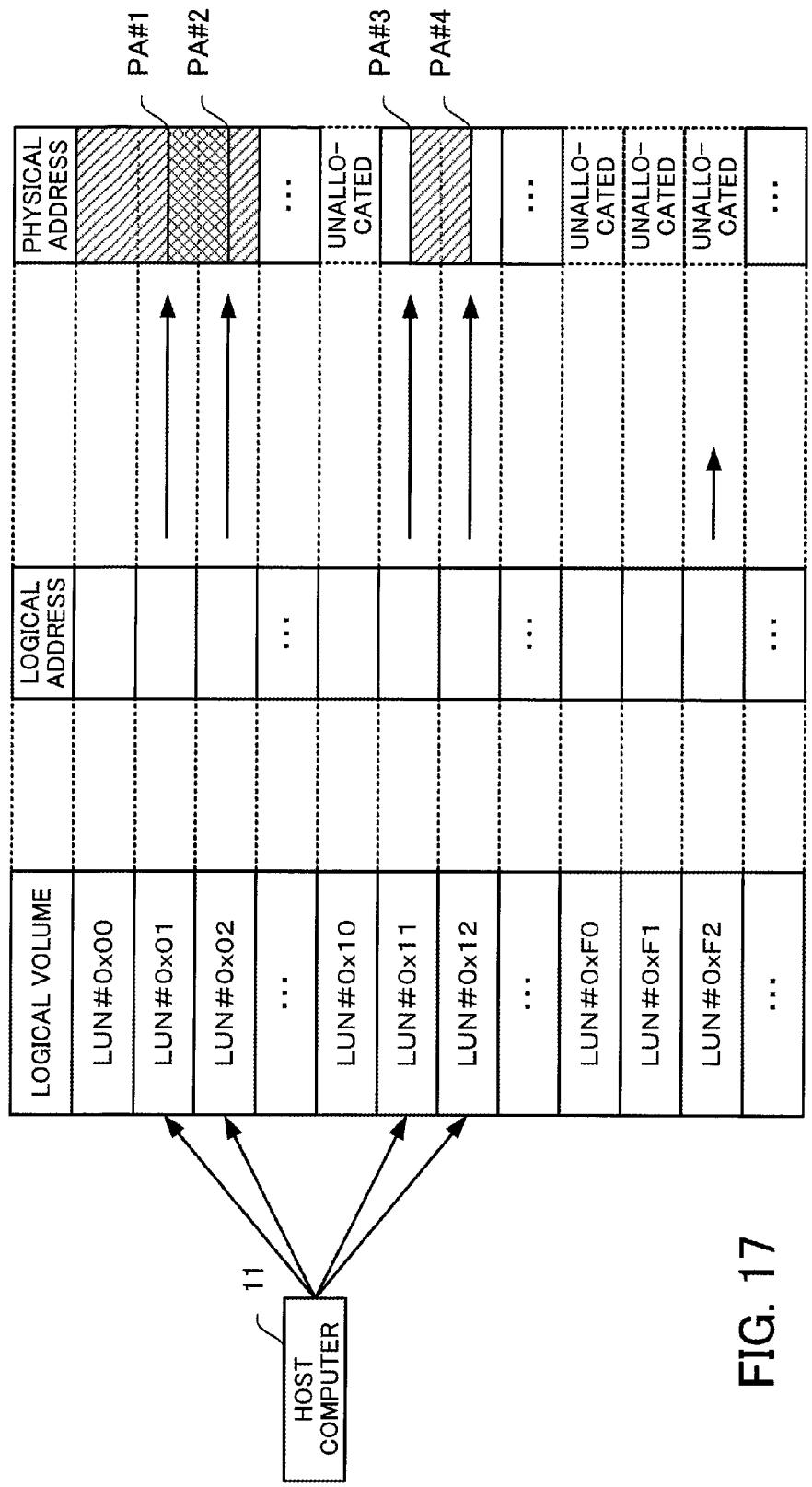
FIG. 17 illustrates a physical address reference before performing UNMAP in the TPPS illustrated in FIGS. 14 and 15.

Now, switching between physical address references before and after performing UNMAP illustrated in FIGS. 14 to 16 will be described, referring to FIGS. 17 and 18. FIG. 17 illustrates a physical address reference before performing UNMAP in the TPPS illustrated in FIGS. 14 and 15.

Before accepting the UNMAP command, the copy source volume 102 had data updating in the TPPS(LUN#0x01) and the TPPS(LUN#0x02). Therefore, the copy destination volume 121, having received physical resource allocation to the TPPS(LUN#0x11) and the TPPS(LUN#0x12), is holding the data before updating. The TPPS(LUN#0x01) is referring to a physical address "PA #1", and the TPPS(LUN#0x02) is referring to a physical address "PA #2". In addition, the TPPS(LUN#0x11) is referring to a physical address "PA #3", and the TPPS(LUN#0x12) is referring to a physical address "PA #4".

The TPPS(LUN#0xF2) of the data saving volume 116 has no physical resource allocation and thus has no physical address to refer to. The storage apparatus 10 masks the data saving volume 116 from the host computer 11, and thus the host computer 11 does not recognize the data saving volume 116.

Figure 18:
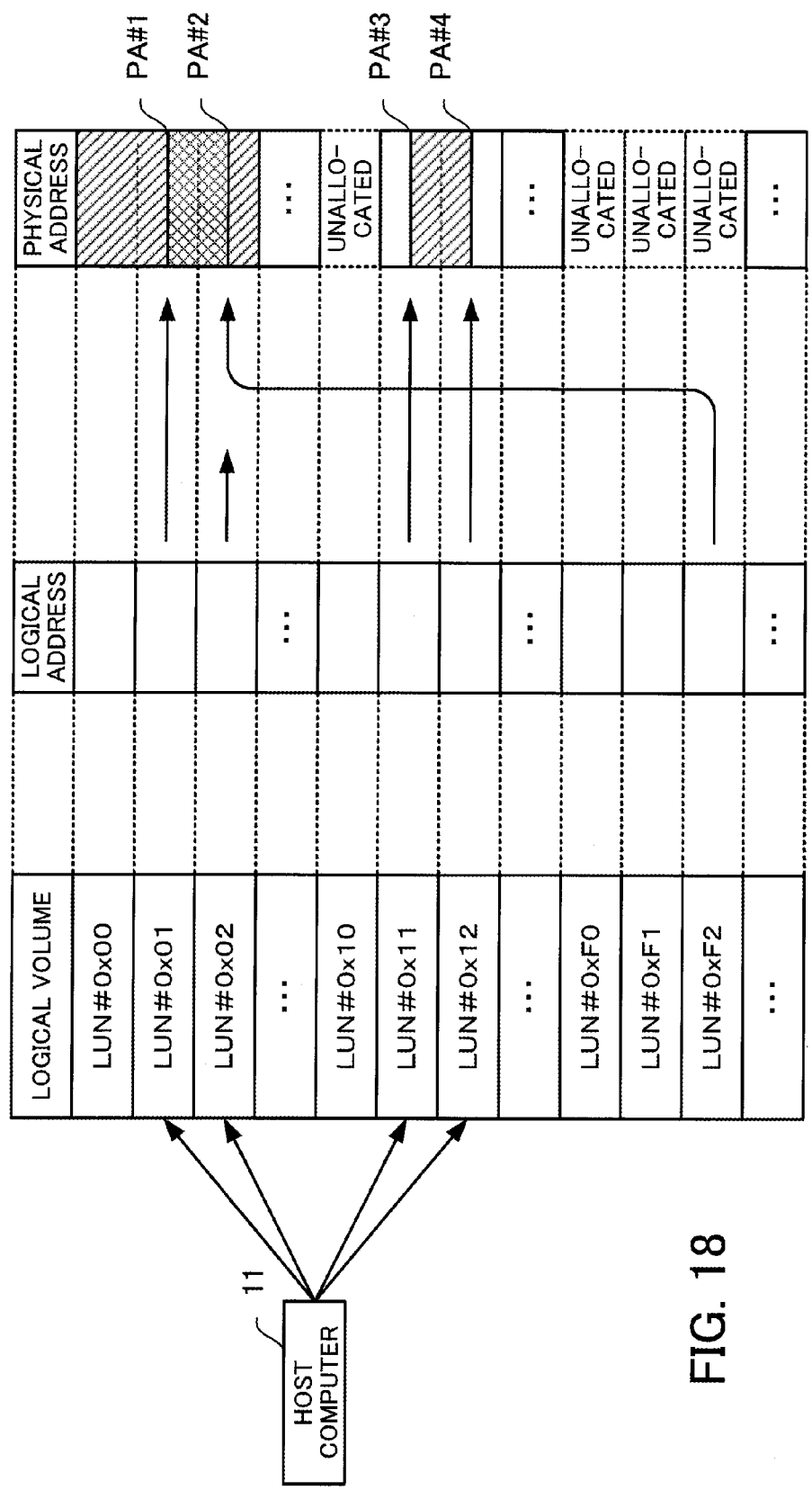
FIG. 18 illustrates a physical address reference after having performed UNMAP in the IPPS illustrated in FIGS. 14 and 15.

FIG. 18 illustrates a physical address reference after having performed UNMAP in the TPPS illustrated in FIGS. 14 and 15.

The TPPS(LUN#0x02) subjected to UNMAP has exchanged its reference destination with the TPPS (LUN#0xF2) and thus has no physical address to refer to. The TPPS(LUN#0xF2) has exchanged its reference destination with the TPPS(LUN#0x02) and thus is referring to the physical address "PA #2".

Thereafter, however, the TPPS(LUN#0xF2) has released its physical resource and thus no longer has a physical address to refer to. In addition, the TPPS(LUN#0x12) holds the data before updating of the copy source volume 102 by copying the saved data before releasing the physical resource of the TPPS(LUN#0xF2).

As thus described, the TPPS(LUN#0x02) has lost allocation of the physical resource due to switching its mapping with the TPPS(LUN#0xF2), and thus may be regarded to have released allocation of the physical resource. In addition, the TPPS(LUN#0x12) is capable of asynchronously copying the data before updating. Therefore, the storage apparatus 10 is capable of quickly providing an UNMAP response to the host computer 11.

Figure 19:
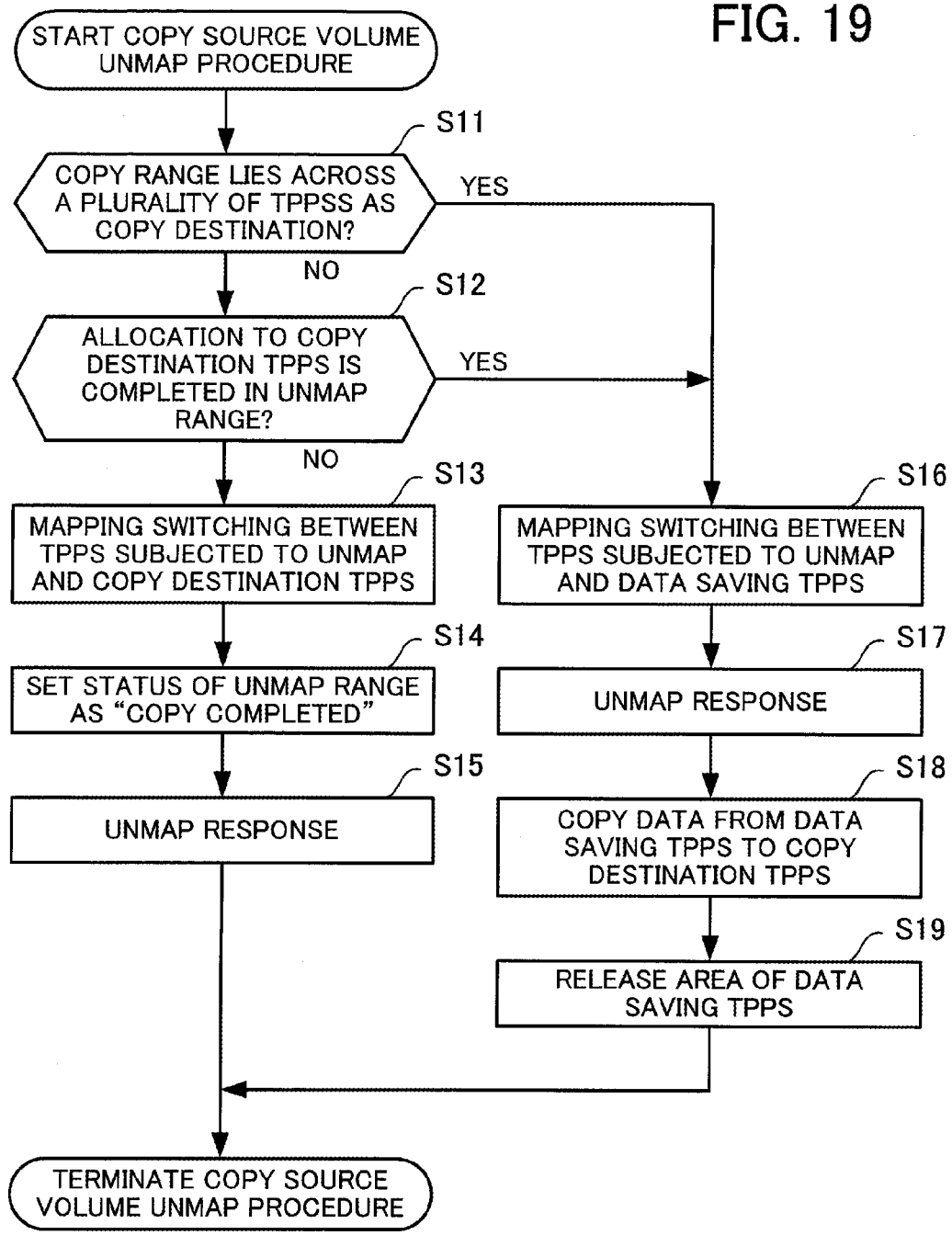
FIG. 19 is a flow chart of a copy source volume UNMAP procedure of the second embodiment.

It is possible to realize the above-mentioned area releasing of the copy source volume by performing a copy source volume UNMAP procedure by the controller module 20, which is the control unit of the storage apparatus 10, by the processor 21. Next, the copy source volume UNMAP procedure performed by the processor 21 of the second embodiment will be described, referring to FIG. 19. FIG. 19 is a flow chart of the copy source volume UNMAP procedure of the second embodiment.

The copy source volume UNMAP procedure is performed in a case that the TPPS subjected to UNMAP belongs to the copy source volume when the storage apparatus 10 accepts the UNMAP procedure.

[Step S11] The controller module 20 determines whether or not the copy range of the TPPS of the copy source volume subjected to UNMAP lies across a plurality of TPPSs in the copy destination volume. The controller module 20 proceeds to step S16 when the copy is performed across a plurality of TPPSs in the copy destination volume, or proceeds to step S12 when the copy is not performed across a plurality of TPPSs. The copy range mentioned here is the range of copying data to the copy destination volume associated with UNMAP of the copy source volume.

[Step S12] The controller module 20 determines whether or not the TPPS of the copy destination volume in the UNMAP range has an allocation. The controller module 20 proceeds to step S16 when the TPPS of the copy destination volume in the UNMAP range has an allocation, or proceeds to step S13 when the TPPS does not have an allocation.

[Step S13] The controller module 20 performs mapping switching between the TPPS of the copy source volume subjected to UNMAP and the corresponding TPPS of the copy destination volume.

[Step S14] The controller module 20 sets the status of the copy range of the TPPS subjected to UNMAP as "copy completed".

[Step S15] The controller module 20 provides an UNMAP response to the host computer 11 and terminates the copy source volume UNMAP procedure.

[Step S16] The controller module 20 performs mapping switching between the TPPS of the copy source volume subjected to UNMAP and the corresponding TPPS of the data saving volume (data saving TPPS). Although the data saving volume has been preliminarily prepared at the start of copy-on-write data backup of the copy source volume, it may be prepared during the copy source volume UNMAP procedure.

[Step S17] The controller module 20 provides an UNMAP response to the host computer 11.

[Step S18] The controller module 20 copies desired data from the data saving TPPS to the corresponding TPPS of the copy destination volume (copy destination TPPS).

[Step S19] The controller module 20 performs area releasing of the data saving TPPS, and terminates the copy source volume UNMAP procedure.

[Area Releasing 1 of Copy Destination Volume]

Figure 20:
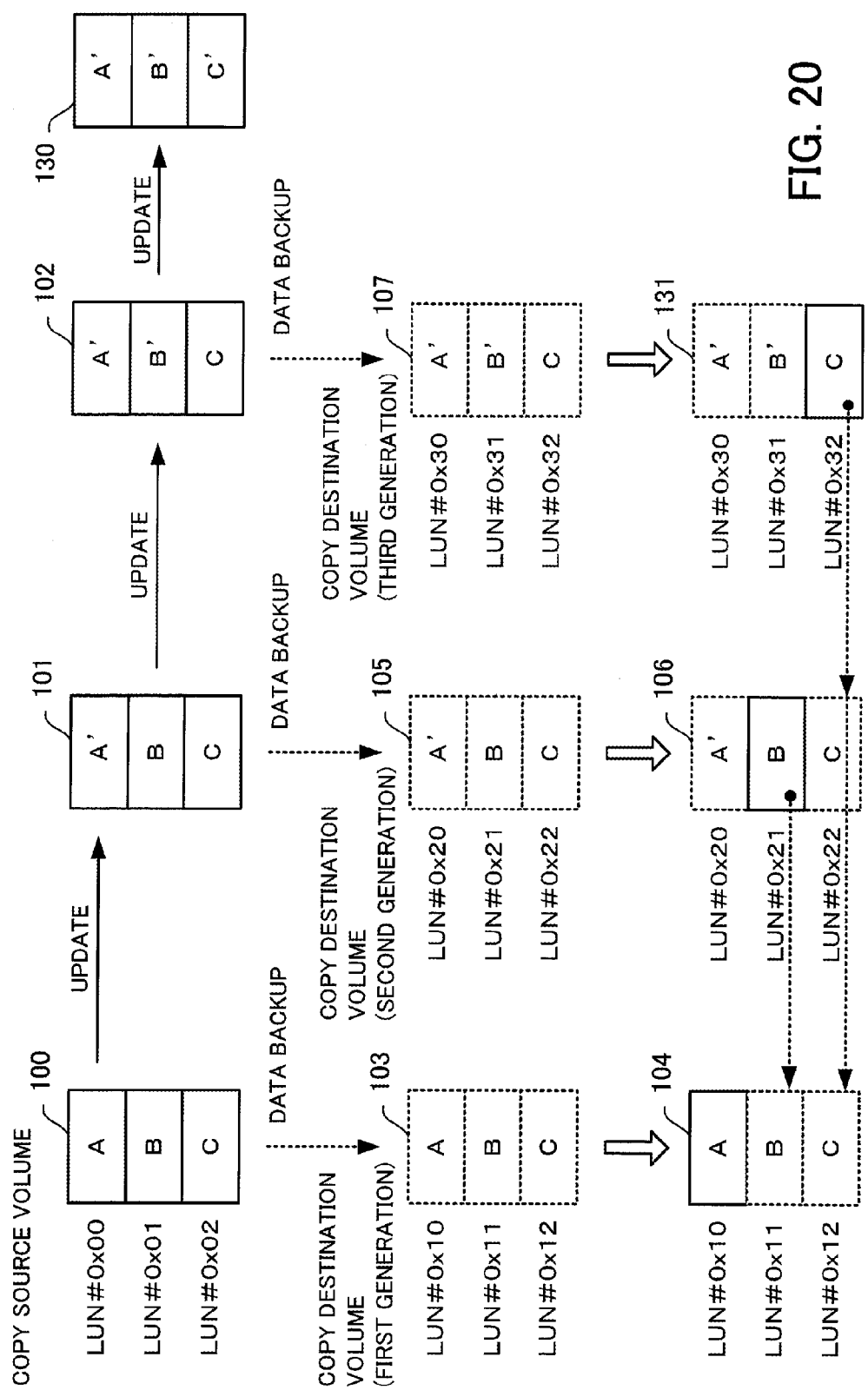
FIG. 20 illustrates a generation backup scheme when the copy source volume is further updated from the generation backup scheme illustrated in FIG. 6.

Next, a physical resource area releasing method of the second embodiment will be described for a case in which area releasing is performed for a copy destination volume. First, a generation backup scheme using a copy-on-write method will be described again, referring to FIG. 20. FIG. 20 illustrates a generation backup scheme when the copy source volume is further updated from the generation backup illustrated in FIG. 6.

A copy source volume 130 has updated data "C" held in the TPPS(LUN#0x02) of the copy source volume 102 to data "C'". At the time of updating, the copy destination volume 107 allocates a physical resource to the TPPS (LUN#0x32), and copies and holds data "C" therein (copy destination volume 131).

Along with the change of the place of storing data "C", the copy destination volume (first generation) 104 and the copy destination volume (second generation) 106 of older generations referring to data "C", update the reference destination thereof to the TPPS(LUN#0x32) of the copy destination volume (third generation) 131.

Therefore, when subjected to the UNMAP command, the copy destination volume 107 may have become the reference destination of the copy destination volume of an older generation such as the TPPS(LUN#0x32). Therefore, the storage apparatus 10, when immediately releasing a physical resource subjected to the UNMAP command from the copy destination volume 107, may result in an inconvenience that an older generation copy destination volume loses its reference destination.

Figure 21:
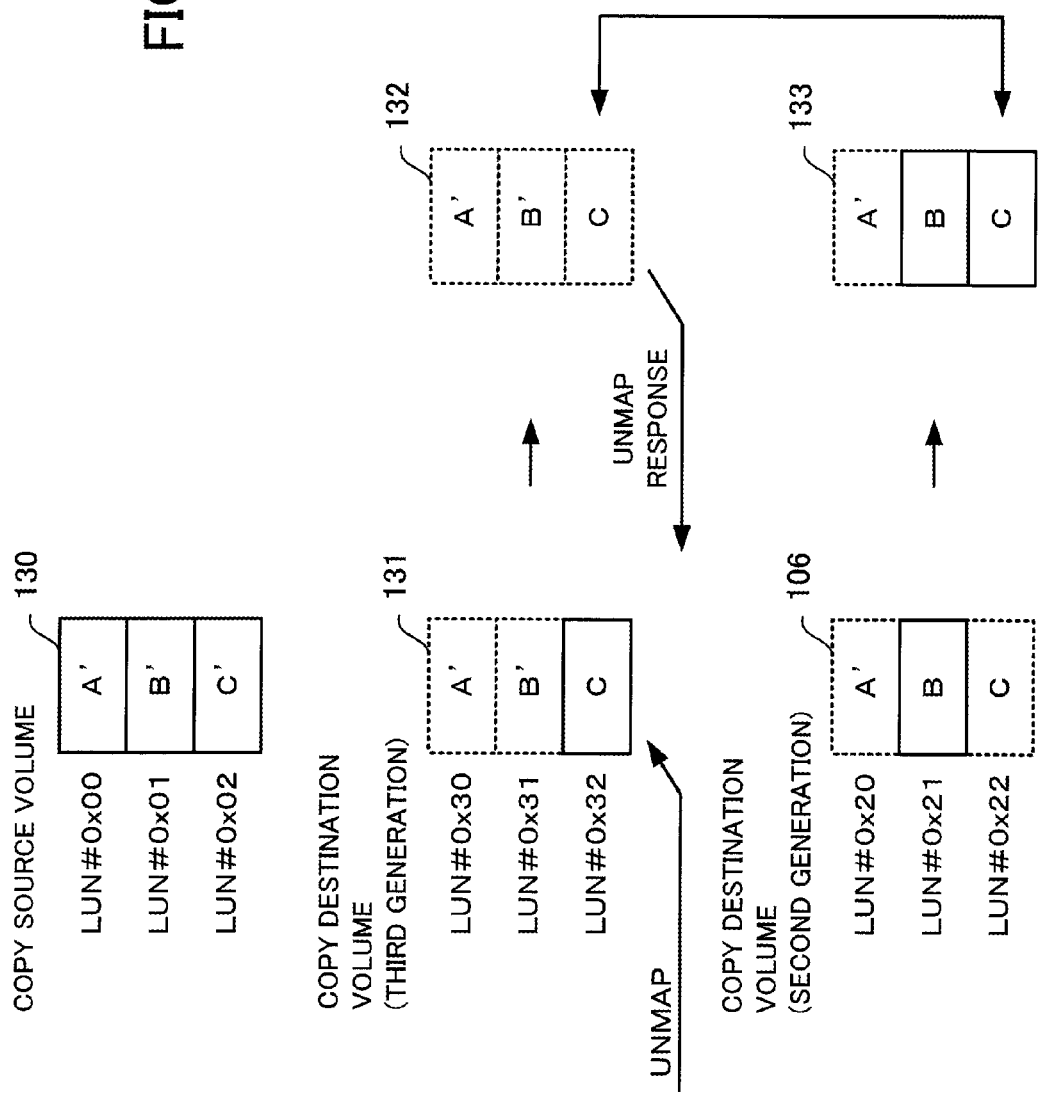
FIG. 21 illustrates an exemplary area releasing of the copy destination volume of the second embodiment.

Therefore, the storage apparatus 10 performs area releasing of the copy destination volume as illustrated in FIG. 21. FIG. 21 illustrates an exemplary area releasing of the copy destination volume of the second embodiment. A case will be described in which the storage apparatus 10 has accepted, from the host computer 11, an UNMAP command for the TPPS(LUN#0x32) of the copy destination volume 131.

The storage apparatus 10 determines whether or not the TPPS(LUN#0x32) subjected to the UNMAP command is referring to a previous generation. In this occasion, the storage apparatus 10 may determine that there is a reference from the previous generation when there is data updating of the next generation for the TPPS(LUN#0x32) subjected to the UNMAP command and there is no data updating of the previous generation.

When there is no reference from the previous generation, the storage apparatus 10 only needs to perform area releasing of the TPPS(LUN#0x32) subjected to the UNMAP command. When, on the other hand, there is a reference from the previous generation, the storage apparatus 10 performs area releasing of the TPPS(LUN#0x32) based on mapping switching.

The storage apparatus 10 determines whether or not there is allocation of an area of the TPPS(LUN#0x22) of the previous generation corresponding to the TPPS(LUN#0x32) subjected to the UNMAP command and, when there is no allocation of an area, performs area releasing of the TPPS (LUN#0x32) as follows.

The storage apparatus 10 switches the mapping of the TPPS(LUN#0x32) of the copy destination volume 131 and the mapping of the TPPS(LUN#0x22) of the copy destination volume 106. Accordingly, in the copy destination volume 131, the physical resource allocated to the TPPS (LUN#0x32) is released (copy source volume 132). In addition, the copy destination volume 106 receives physical resource allocation to the TPPS(LUN#0x22), and holds data "C" in the physical resource which has received allocation (copy destination volume 133).

In order to prevent copy operation in the range of the TPPS(LUN#0x32) after mapping switching, the storage apparatus 10 updates the control information for managing the progress of copy, and sets the copy operation status in the range of the TPPS(LUN#0x32) as "completed".

The storage apparatus 10 reports, to the host computer 11, completion of UNMAP for the TPPS(LUN#0x32) of the copy source volume 133 (UNMAP response).

Although not illustrated, the TPPS(LUN#0x12) of the copy destination volume (first generation) 104 updates its reference destination to the TPPS(LUN#0x22) of the copy destination volume (second generation) 133.

Figure 22:
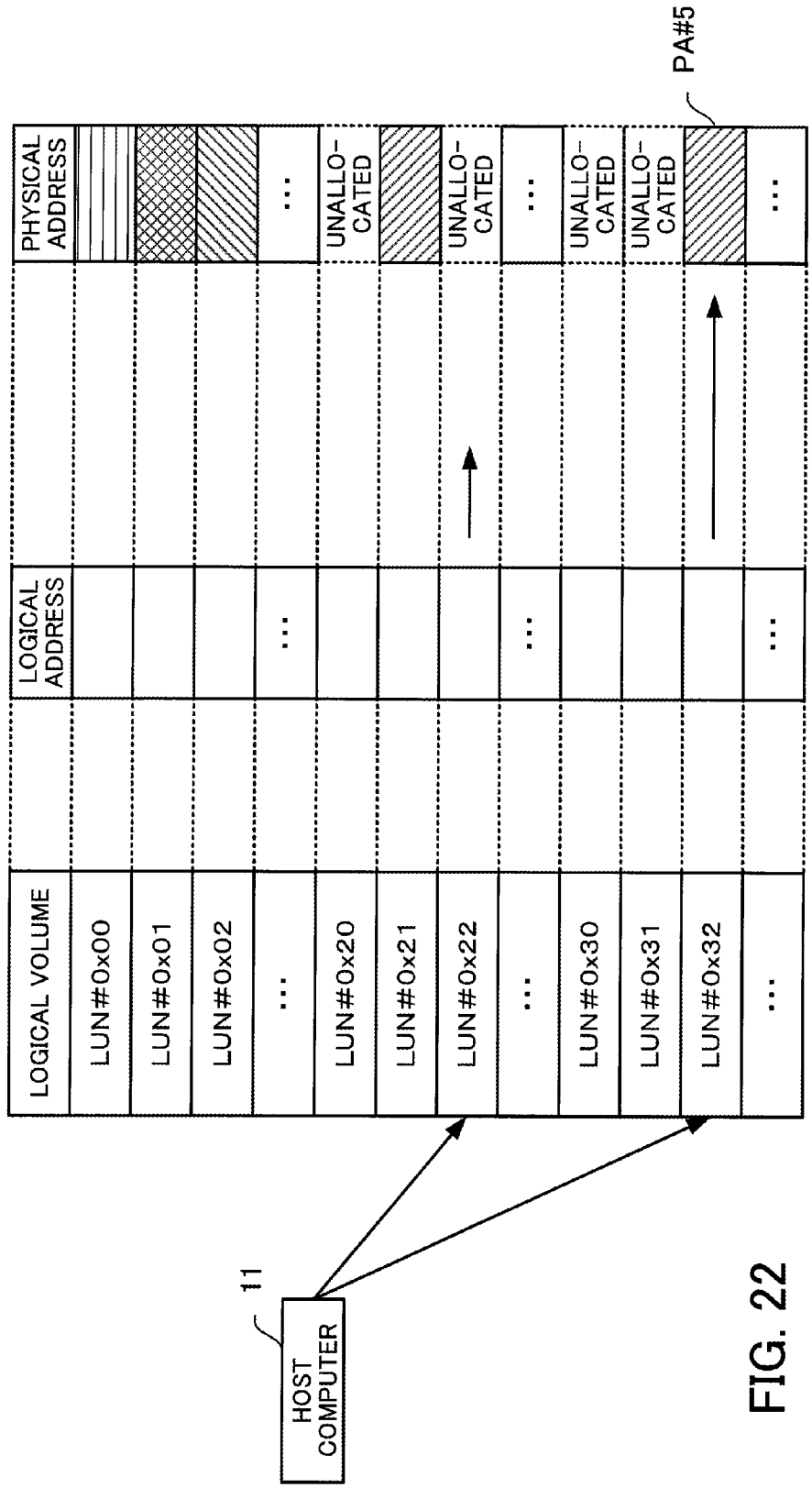
FIG. 22 illustrates a physical address reference before performing UNMAP in the IPPS illustrated in FIG. 21.

Now, switching between physical address references before and after performing UNMAP illustrated in FIG. 21 will be described, referring to FIGS. 22 and 23. FIG. 22 illustrates a physical address reference before performing UNMAP in the TPPS illustrated in FIG. 21.

The TPPS(LUN#0x32) subjected to UNMAP has a physical resource allocation and is referring to a physical address "PA #5". The TPPS(LUN#0x22) has no physical resource allocation and thus has no physical address to refer to.

Figure 23:
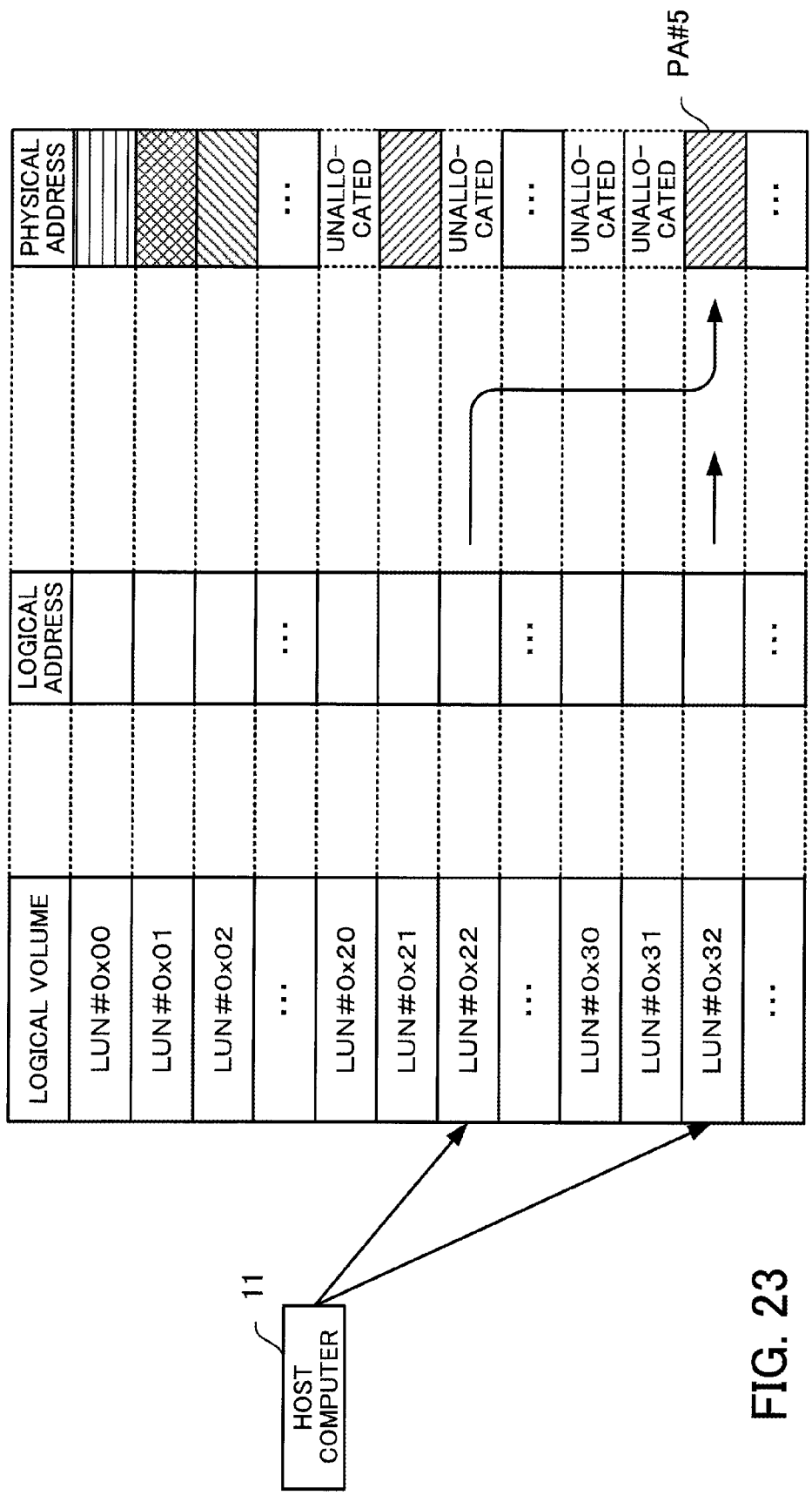
FIG. 23 illustrates a physical address reference after having performed UNMAP in the IPPS illustrated in FIG. 21.

FIG. 23 illustrates a physical address reference after having performed UNMAP in the TPPS illustrated in FIG. 21.

The TPPS(LUN#0x32) subjected to UNMAP has exchanged its reference destination with the TPPS (LUN#0x22) and thus has no physical address to refer to. The TPPS(LUN#0x22) has exchanged its reference destination with the TPPS(LUN#0x32) and thus is referring to the physical address "PA #5".

As thus described, the TPPS(LUN#0x32) has lost the physical resource allocation, and thus may be regarded to have released the physical resource allocation. In addition, the TPPS(LUN#0x22), being allowed to refer to the physical address "PA #5", may be regarded to have received physical resource allocation. In addition, since the physical address "PA #0" holds data, data copy becomes unnecessary in comparison with the case of newly receiving physical resource allocation. Therefore, the storage apparatus 10 is capable of quickly providing a UNMAP response to the host computer 11.

[Area Releasing 2 of Copy Destination Volume]

Next, a case will be described in which it is impossible to simply switch mappings of TPPSs of copy destination volumes of different generations. When area of the copy destination volume is released, as described above referring to FIGS. 10 and 11, one case in which it is impossible to simply switch mappings of TPPSs is such that there has been updating of data in a TPPS subjected to UNMAP. In other words, it is a case in which the switching destination of mapping of the TPPS has already received physical resource allocation. In addition, another case in which it is impossible to simply switch mappings of TPPSs is such that the range of the copy destination of the TPPS subjected to UNMAP lies across a plurality of TPPSs.

Figure 24:
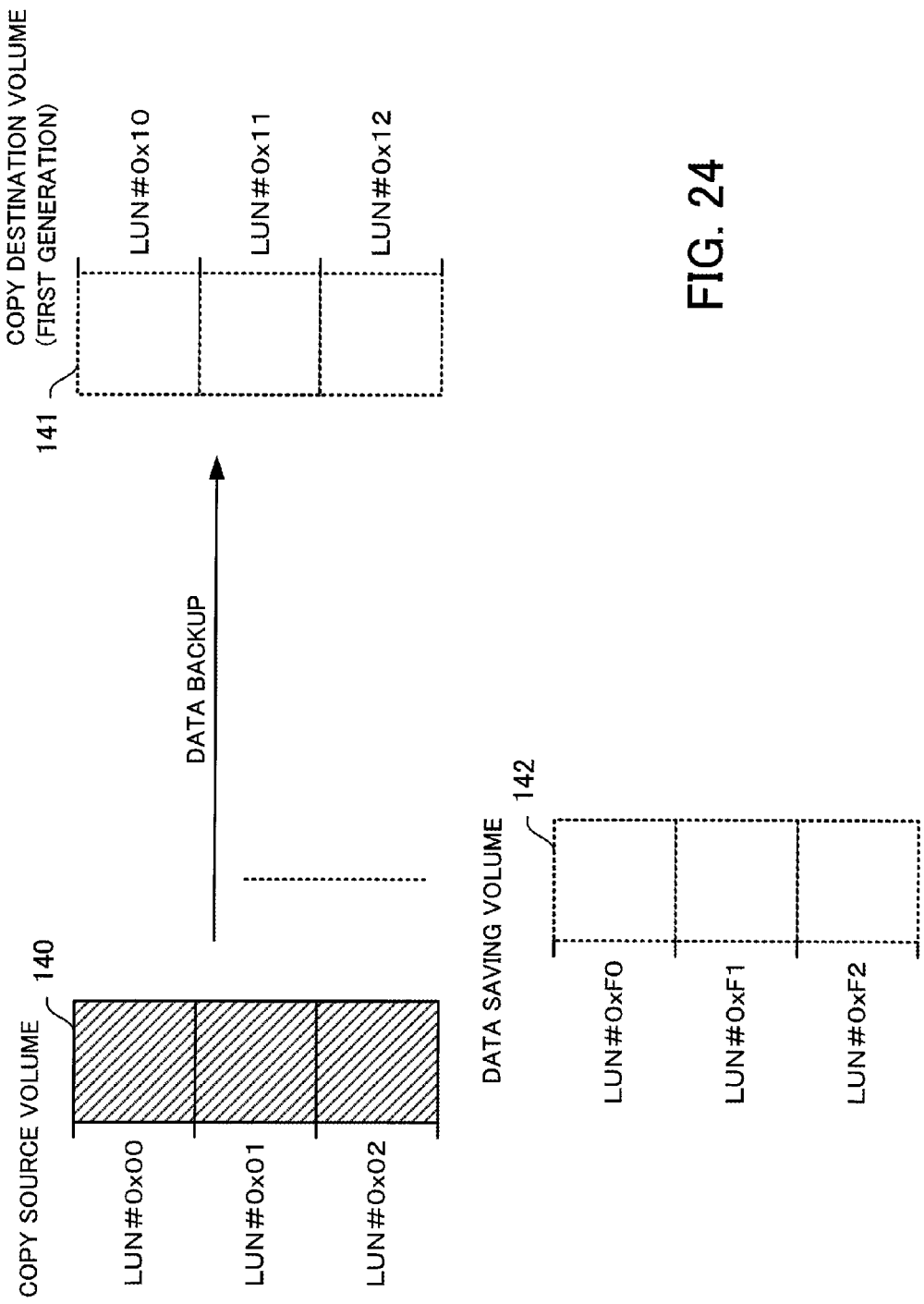
FIG. 24 illustrates a copy source volume, a copy destination volume, and a data saving volume at the time of starting data backup.

Therefore, the storage apparatus 10 allows a quick UNMAP response by preparing a data saving volume for temporarily saving data. Area releasing for a copy source volume using a data saving volume will be described, referring to FIGS. 24 to 30. FIG. 24 illustrates a copy source volume, a copy destination volume, and a data saving volume at the time of starting data backup.

The storage apparatus 10 prepares a data saving volume 142 at the time of starting data backup (data backup using the copy-on-write method) of a copy source volume 140. The size of the data saving volume 142 is the same as that of the copy source volume 140. The copy source volume 140 has the TPPS(LUN#0x00), the TPPS(LUN#0x01), and the TPPS(LUN#0x02), each of which has received physical resource allocation. A copy destination volume (first generation) 141 has the TPPS(LUN#0x10), the TPPS (LUN#0x11), and the TPPS(LUN#0x12), each of which has not yet received physical resource allocation. A data saving volume 142 has the TPPS(LUN#0xF0), the TPPS (LUN#0xF1), and the TPPS(LUN#0xF2), each of which has not yet received physical resource allocation.

Figure 25:
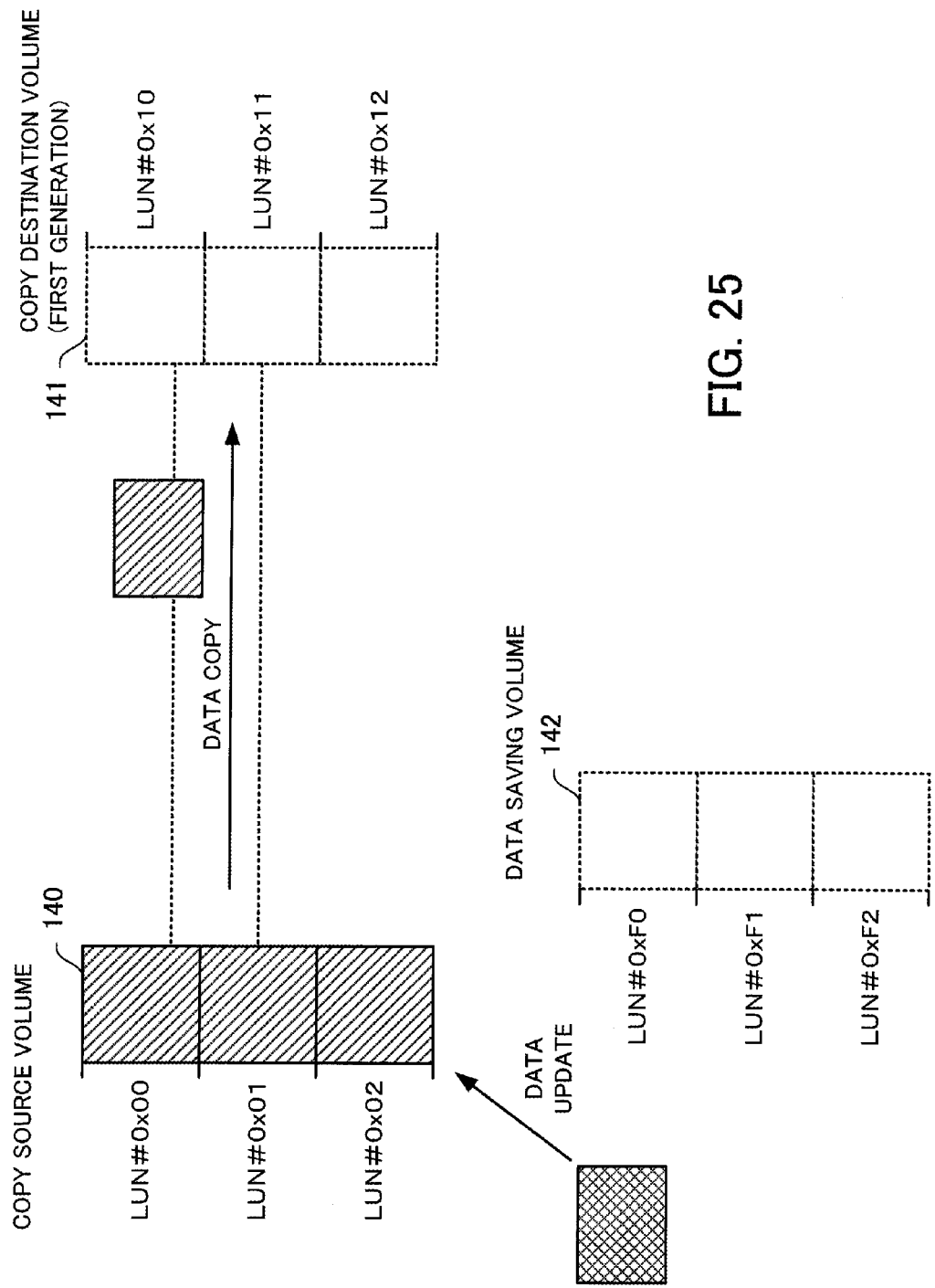
FIG. 25 illustrates a copy source volume, a copy destination volume, and a data saving volume after having accepted and before performing data updating of the IPPS of the copy source volume.

Here, it is assumed that the storage apparatus 10 has accepted data updating (write I/O) of an area lying across the TPPS(LUN#0x00) and the TPPS(LUN#0x01) of the copy source volume 140. FIG. 25 illustrates a copy source volume, a copy destination volume, and a data saving volume after having accepted and before performing data updating of the TPPS of the copy source volume. The storage apparatus 10 allocates a physical resource to the TPPS (LUN#0x10) and the TPPS(LUN#0x11), and copies the data before updating.

Figure 26:
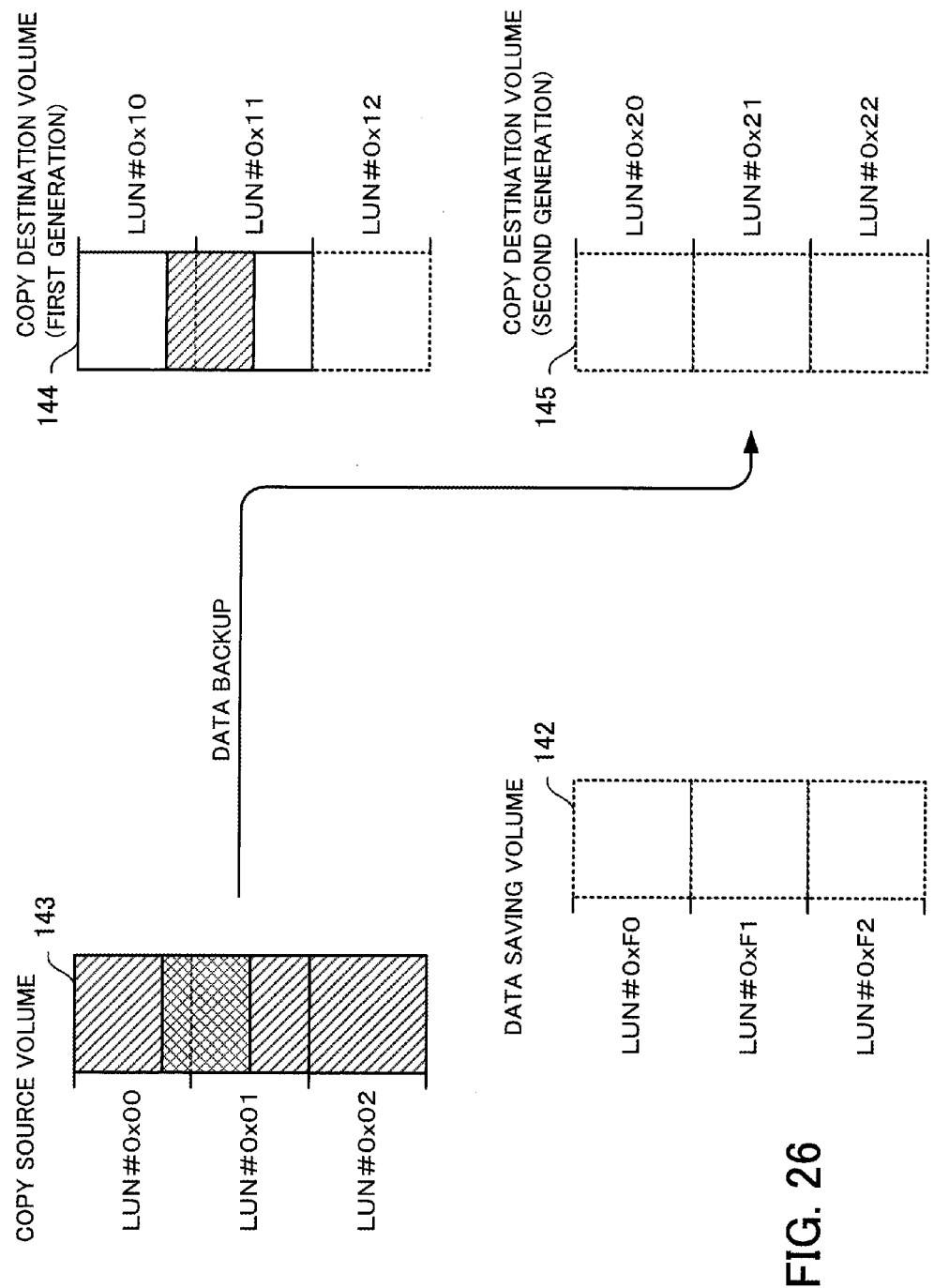
FIG. 26 illustrates a copy source volume, copy destination volumes for two generations, and a data saving volume after having performed data updating of the IPPS of the copy source volume.

FIG. 26 illustrates a copy source volume, copy destination volumes for two generations, and a data saving volume after having performed data updating of the TPPS of the copy source volume. A copy source volume 143 is the result of the copy source volume 140 after having performed data updating. A copy destination volume 144 is the result of the copy destination volume 141 after having performed data copy. After having performed data updating of the copy source volume 140, the storage apparatus 10 performs data backup of the copy source volume 143 and generates a copy destination volume (second generation) 145.

Figure 27:
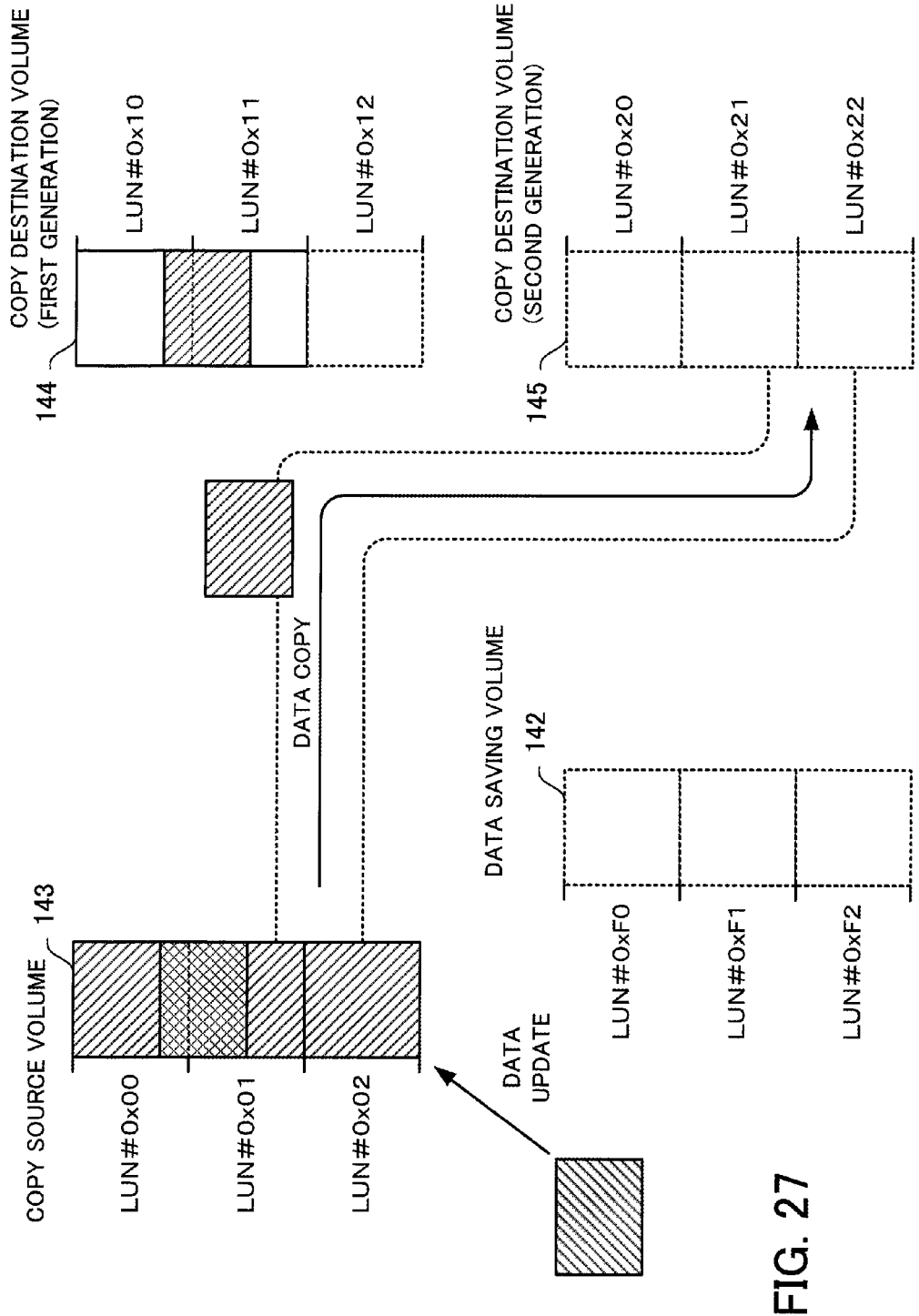
FIG. 27 illustrates a copy source volume, copy destination volumes for two generations, and a data saving volume after having accepted and before performing data updating of the IPPS of the copy source volume.

Here, it is assumed that the storage apparatus 10 has accepted data updating (write I/O) of an area lying across the TPPS(LUN#0x01) and the TPPS(LUN#0x02) of the copy source volume 143. FIG. 27 illustrates a copy source volume, copy destination volumes for two generations, and a data saving volume after having accepted and before performing data updating of the TPPS of the copy source volume. The storage apparatus 10 allocates a physical resource to the TPPS(LUN#0x21) and the TPPS (LUN#0x22), and copies the data before updating.

Figure 28:
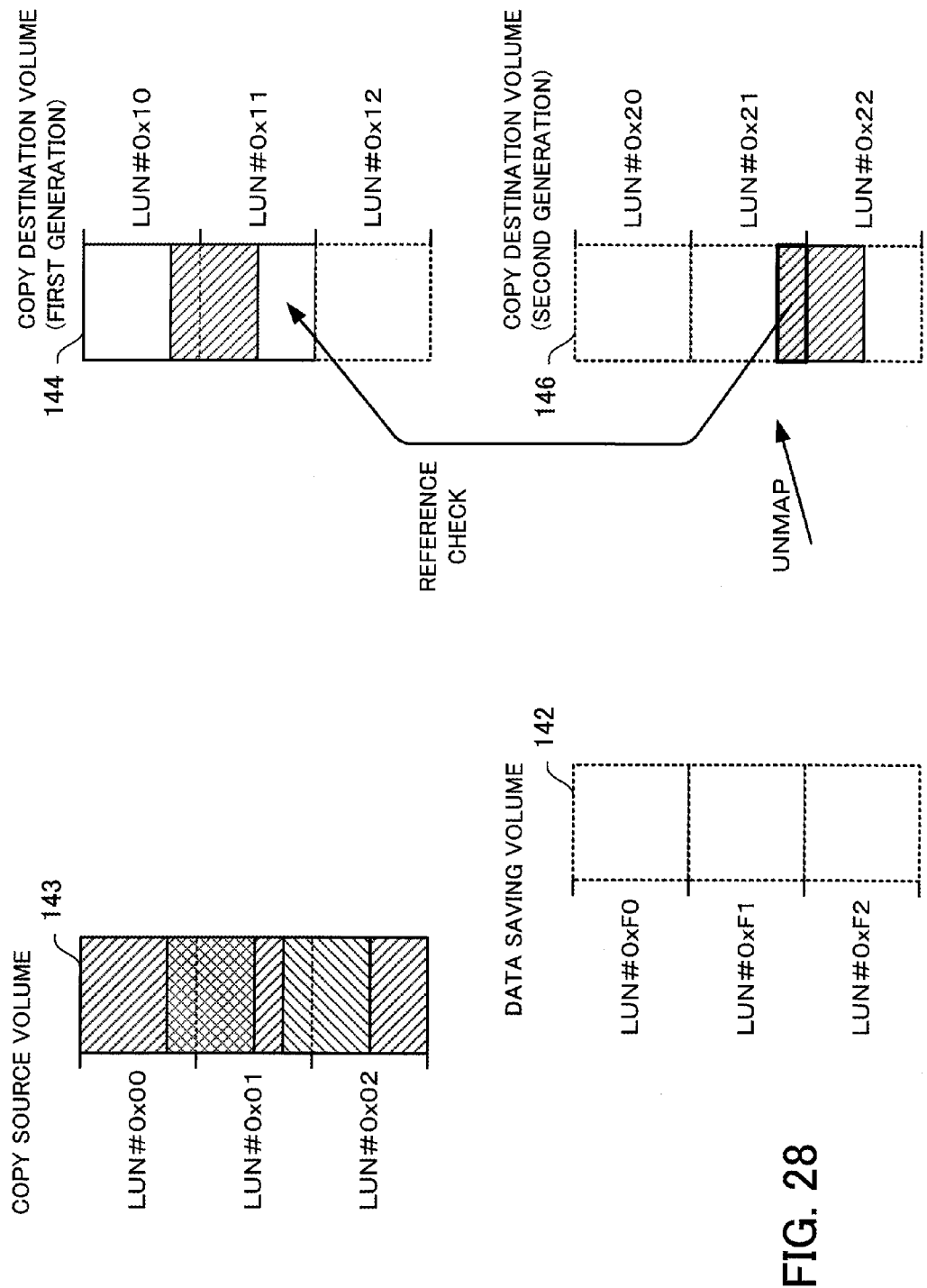
FIG. 28 illustrates a copy source volume, copy destination volumes for two generations, and a data saving volume after having accepted and performed data updating of the IPPS of the copy source volume.

FIG. 28 illustrates a copy source volume, copy destination volumes for two generations, and a data saving volume after having accepted and performed data updating of the TPPS of the copy source volume. The copy destination volume 145 turns into a copy destination volume 146 by copying data to the TPPS(LUN#0x21) and the TPPS(LUN#0x22). The storage apparatus 10 accepts, from the host computer 11, an UNMAP command for the TPPS(LUN#0x21) of the copy destination volume 146.

With regard to the UNMAP command accepted in such a situation, it is impossible for the storage apparatus 10 to perform area releasing of the TPPS(LUN#0x21) by simply switching the mappings of the TPPS (LUN#0x21) and the TPPS(LUN#0x11).

The storage apparatus 10 checks whether or not the data held in the TPPS(LUN#0x21) subjected to UNMAP is referred to from a previous generation. When there is no reference from a previous generation, the storage apparatus 10 may immediately perform area releasing and provide an UNMAP response (not illustrated). When there is reference from a previous generation, the storage apparatus 10 checks whether or not the reference source lies across a plurality of TPPSs.

On the other hand, when there is reference from a previous generation, it is impossible for the storage apparatus 10 to immediately perform area releasing because the previous generation may lose its reference destination. The TPPS(LUN#0x21) of the copy destination volume 146 corresponds to a case in which immediate area releasing is impossible because the area surrounded by the bold line is referred to by the copy destination volume (first generation) 144.

Figure 29:
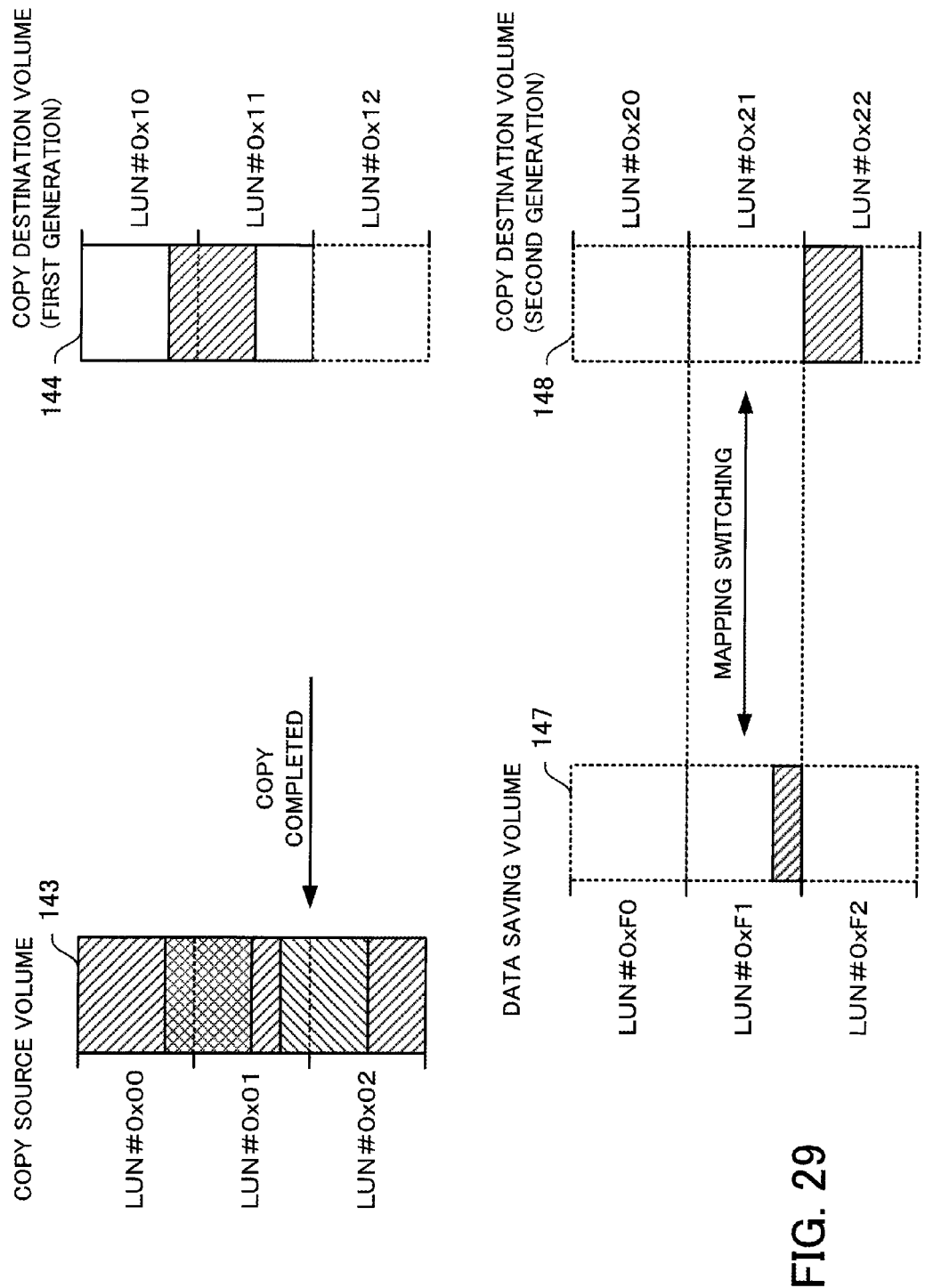
FIG. 29 illustrates a copy source volume, copy destination volumes for two generations, and a data saving volume after having accepted and performed data updating of the TPPS of the copy source volume.

FIG. 29 illustrates a copy source volume, copy destination volumes for two generations, and a data saving volume after having accepted and performed data updating of the TPPS of the copy source volume.

The storage apparatus 10 switches the mapping of the TPPS(LUN#0x21) of the copy destination volume 145 and the mapping of the TPPS(LUN#0xF1) of the data saving volume 142. As a result, the copy destination volume 146 turns into a copy destination volume 148, and the physical resource which has been allocated to the TPPS(LUN#0x21) is released. In addition, the data saving volume 147 receives physical resource allocation to the TPPS(LUN#0xF1) and holds, in the allocated physical resource, the data which has been held in the copy destination volume 145.

In order to prevent copy operation in the range of the TPPS(LUN#0x01) after mapping switching, the storage apparatus 10 updates the control information for managing the progress of copy, and sets the copy operation status in the range of the TPPS(LUN#0x01) as "completed".

Figure 30:
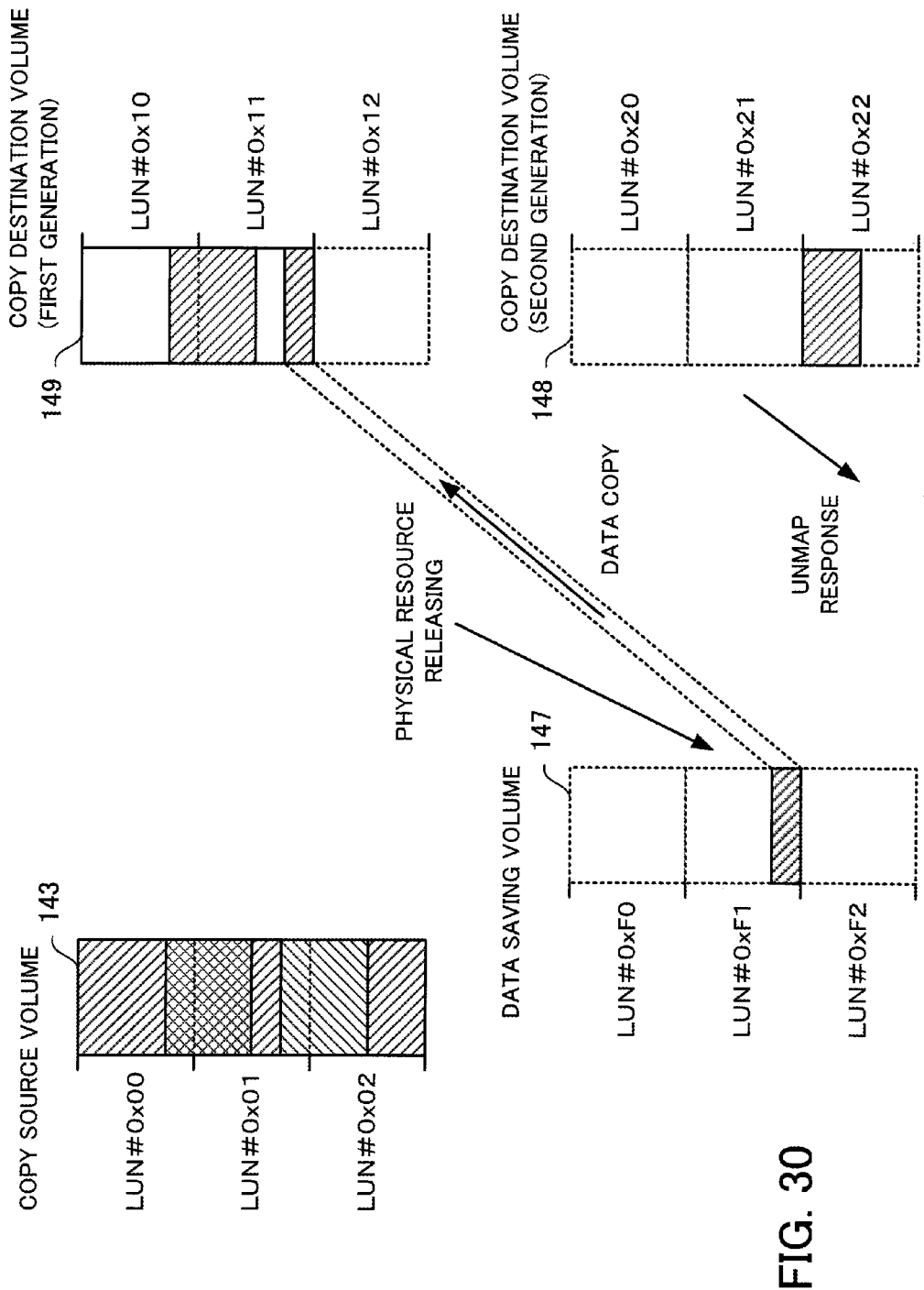
FIG. 30 illustrates a copy source volume, copy destination volumes for two generations, and a data saving volume after completion of UNMAP has been reported.

FIG. 30 illustrates a copy source volume, copy destination volumes for two generations, and a data saving volume after completion of UNMAP has been reported. The storage apparatus 10 reports, to the host computer 11, completion of UNMAP for the TPPS(LUN#0x21) of the copy destination volume 148 (UNMAP response).

After having provided an UNMAP response, the storage apparatus 10 copies, among the data saved in the TPPS (LUN#0xF1) of the data saving volume 147, copy-uncompleted data to the TPPS(LUN#0x11) of the copy destination volume 144 (copy destination volume 149). The storage apparatus 10 releases the physical resource which has been allocated to the TPPS(LUN#0xF1) of the data saving volume 147 after having completed copying.

As thus described, the storage apparatus 10 is capable of copying data which has been saved asynchronously with the UNMAP response, and releasing the physical resource of the data saving volume 147. Therefore, the storage apparatus 10 is capable of quickly providing a response to the host computer 11 without causing a command time-out even if it takes time to copy the saved data.

Figure 31:
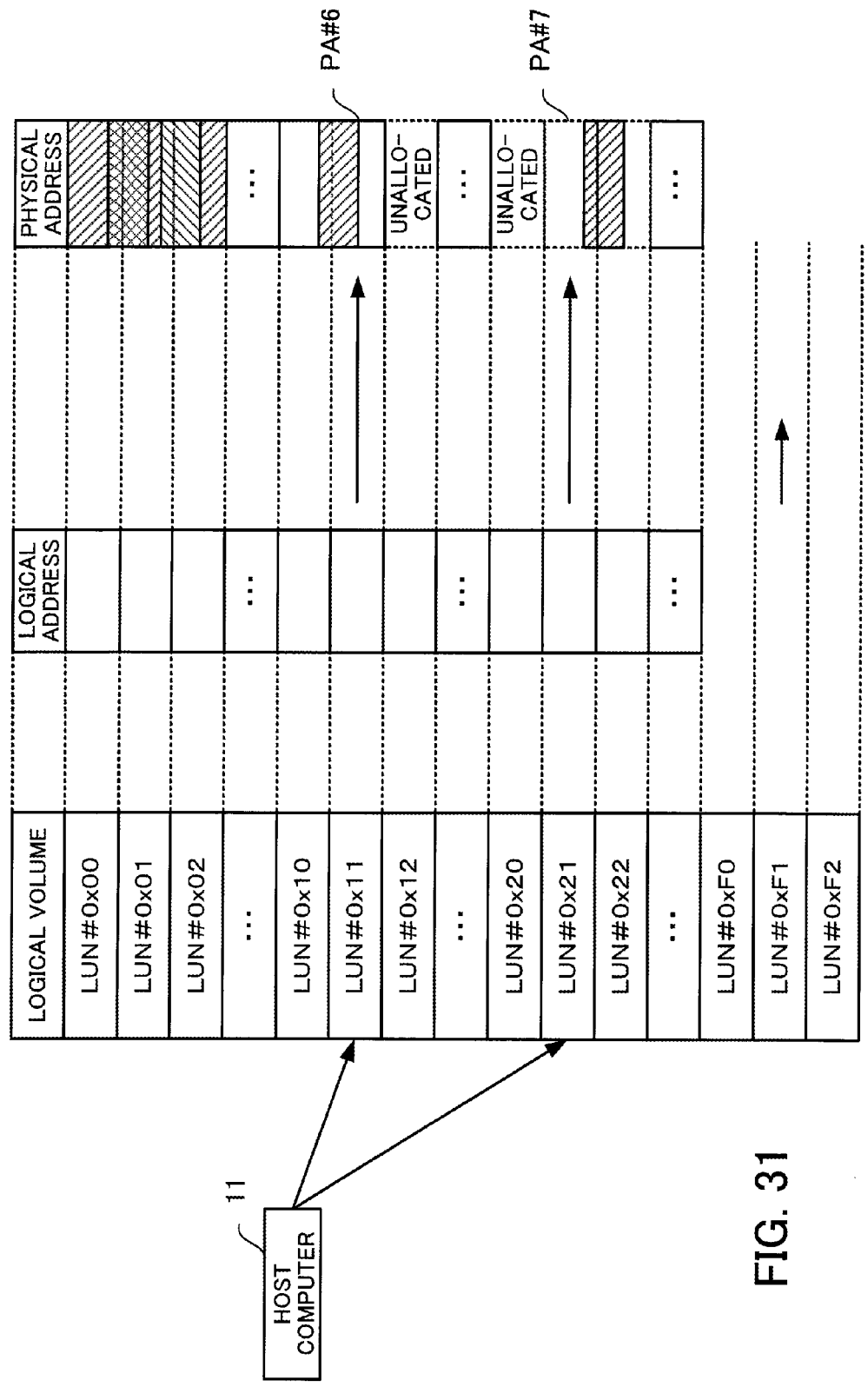
FIG. 31 illustrates a physical address reference before performing UNMAP in the TPPS illustrated in FIGS. 24 to 30.

Now, switching between physical address references before and after performing UNMAP illustrated in FIGS. 24 to 30 will be described, referring to FIGS. 31 and 32. FIG. 31 illustrates a physical address reference before performing UNMAP in the TPPS illustrated in FIGS. 24 to 30.

Before accepting the UNMAP command, the copy source volume 143 had data updating in the TPPS(LUN#0x00), the TPPS(LUN#0x01), and the TPPS(LUN#0x02). Therefore, the copy destination volume 144, having received physical resource allocation to the TPPS(LUN#0x10) and the TPPS (LUN#0x11), is holding the data before updating. In addition, the copy destination volume 146, having received physical resource allocation to the TPPS(LUN#0x21) and the TPPS(LUN#0x22), is holding the data before updating.

The TPPS(LUN#0x11) is referring to a physical address "PA #6", and the TPPS(LUN#0x21) is referring to a physical address "PA #7".

The TPPS(LUN#0xF1) of the data saving volume 142 has no physical resource allocation and thus has no physical address to refer to. The storage apparatus 10 masks the data saving volume 142 from the host computer 11, and thus the host computer 11 does not recognize the data saving volume 142.

Figure 32:
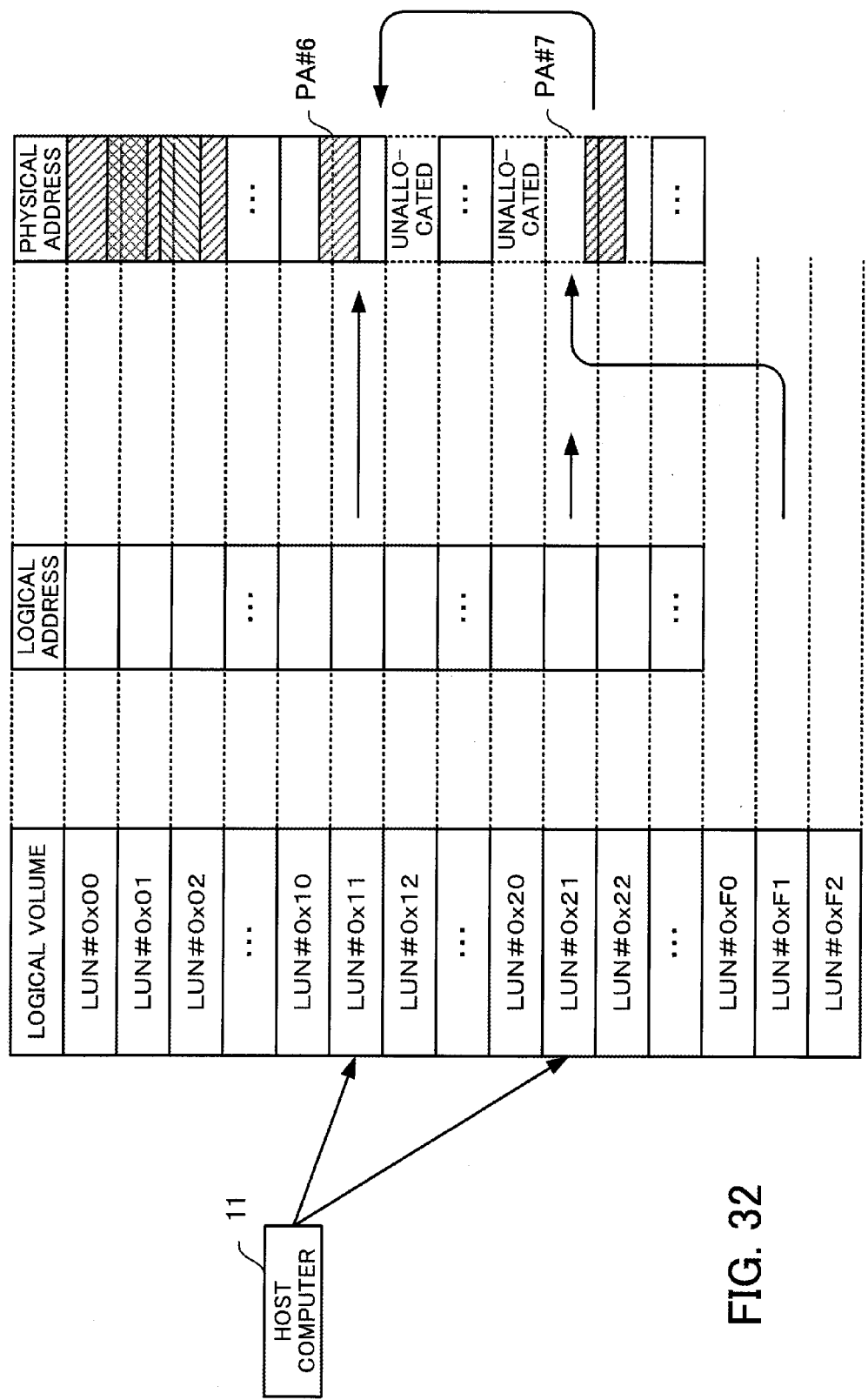
FIG. 32 illustrates a physical address reference after having performed UNMAP in the TPPS illustrated in FIGS. 24 to 30.

FIG. 32 illustrates a physical address reference after having performed UNMAP in the TPPS illustrated in FIGS. 24 to 30.

The TPPS(LUN#0x21) subjected to UNMAP has exchanged its reference destination with the TPPS (LUN#0xF1) and thus has no physical address to refer to. The TPPS(LUN#0xF1) has exchanged its reference destination with the TPPS(LUN#0x21) and thus is referring to the physical address "PA #7".

Thereafter, however, the TPPS(LUN#0xF1) has released its physical resource and thus no longer has a physical address to refer to. In addition, the TPPS(LUN#0x11) holds the data before updating of the copy source volume 143 by copying the saved data before releasing the physical resource of the TPPS(LUN#0xF1).

As thus described, the TPPS(LUN#0x21) has lost allocation of the physical resource due to mapping switching with the TPPS(LUN#0xF1), and thus may be regarded to have released allocation of the physical resource. In addition, the TPPS(LUN#0x11) is capable of asynchronously copying the data before updating. Therefore, the storage apparatus 10 is capable of quickly providing a UNMAP response to the host computer 11.

Figure 33:
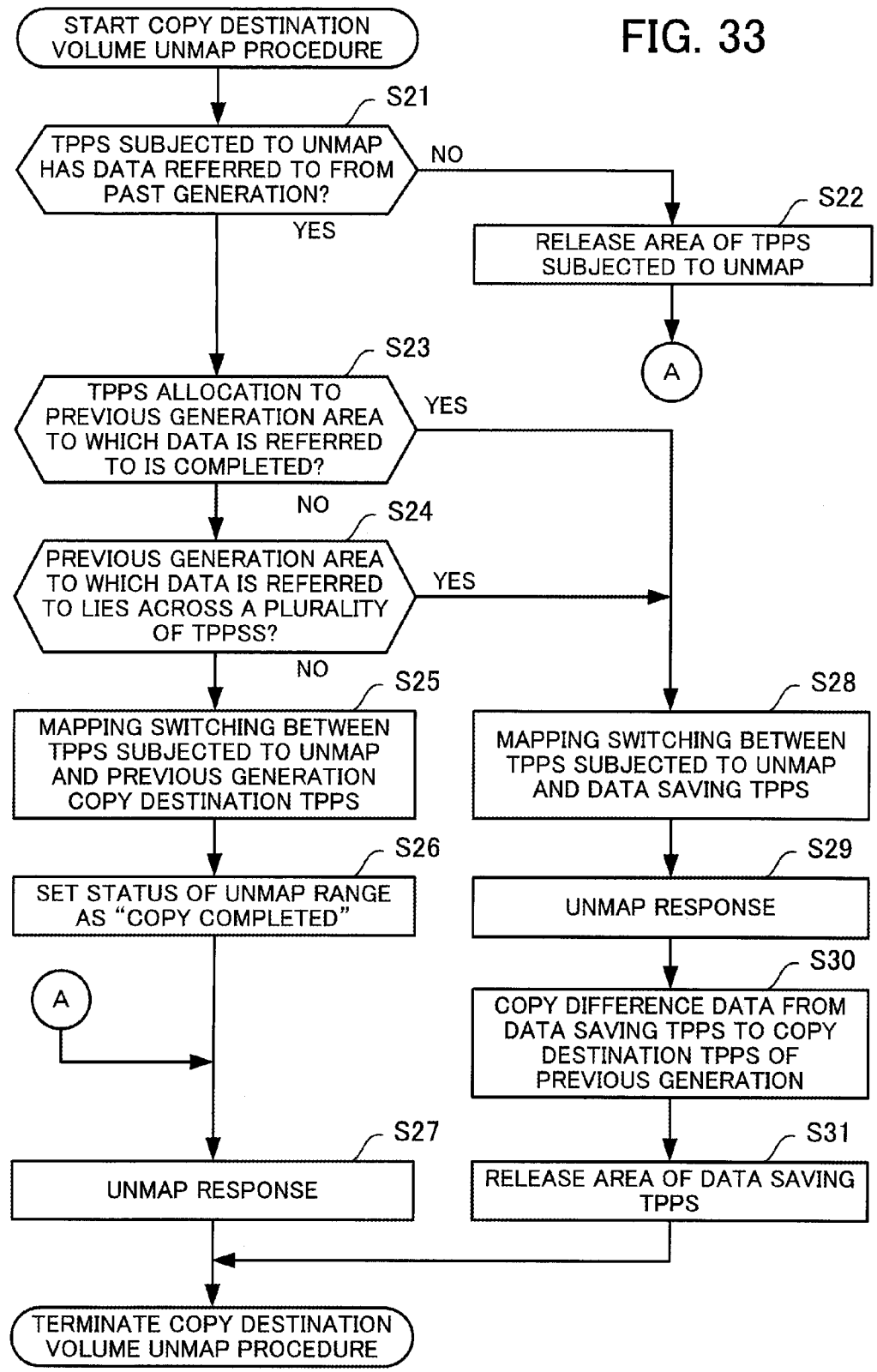
FIG. 33 is a flow chart of a copy destination volume UNMAP procedure of the second embodiment.

The above-mentioned area releasing of the copy source volume may be realized by performing a copy destination volume UNMAP procedure by the controller module 20, which is the control unit of the storage apparatus 10, by the processor 21. Next, the copy destination volume UNMAP procedure performed by the processor 21 of the second embodiment will be described, referring to FIG. 33. FIG. 33 is a flow chart of the copy destination volume UNMAP procedure of the second embodiment.

The copy destination volume UNMAP procedure is performed in a case that the TPPS subjected to UNMAP belongs to the copy destination volume when the storage apparatus 10 accepts the UNMAP procedure.

[Step S21] The controller module 20 determines whether or not there exists, in the TPPS subjected to UNMAP, data which is referred to from a past generation. The controller module 20 proceeds to step S23 when there exists, in the TPPS subjected to UNMAP, data which is referred to from a past generation, or proceeds to step S22 when there exists no data which is referred to from a past generation.

[Step S22] The controller module 20 performs area releasing (releasing of allocation of the physical resource) of the TPPS subjected to UNMAP.

[Step S23] The controller module 20 determines whether or not the TPPS of the previous generation area which refers to data has an area allocation. The controller module 20 proceeds to step S28 when the TPPS has an area allocation, or proceeds to step S24 when the TPPS does not have an area allocation.

[Step S24] The controller module 20 determines whether or not the previous generation area which refers to data lies across a plurality of TPPSs. The controller module 20 proceeds to step S28 when the previous generation area which refers to data lies across a plurality of TPPSs, or proceeds to step S25 when the area does not lie across a plurality of TPPSs.

[Step S25] The controller module 20 performs mapping switching between the TPPS subjected to UNMAP and the previous generation copy destination TPPS.

[Step S26] The controller module 20 sets the status of the range subjected to UNMAP as "copy completed".

[Step S27] The controller module 20 provides an UNMAP response to the host computer 11 and terminates the copy destination volume UNMAP procedure.

[Step S28] The controller module 20 performs mapping switching between the TPPS subjected to UNMAP and a corresponding TPPS of the data saving volume (data saving TPPS). Although the data saving volume has been preliminarily prepared at the time of starting the copy-on-write data backup of the copy source volume, it may be prepared during the copy source volume UNMAP procedure.

[Step S29] The controller module 20 provides an UNMAP response to the host computer 11.

[Step S30] The controller module 20 copies desired data (difference data) from the data saving TPPS to the corresponding TPPS (copy destination TPPS) of the copy destination volume.

[Step S31] The controller module 20 performs area releasing of the data saving TPPS and terminates the copy destination volume UNMAP procedure.

Although description has been provided with the storage apparatus 10 taken as an example, other types of information processing apparatuses may also be employed.

The processing function described above may be realized by a computer. In such a case, there is provided a program describing processing contents of the function to be included in the storage apparatus 1, or the storage apparatus 10 (controller module 20). Execution of the program by a computer realizes the processing function on the computer. The program describing the processing contents may be stored in a computer-readable storage medium. As computer-readable storage media, there are magnetic memory devices, optical disks, magneto optical storage media, semiconductor memories, or the like. As magnetic storage devices, there are Hard Disk Drives (HDD), Flexible Disks (FD), magnetic tapes, or the like. As optical disks, there are DVDs, DVD-RAMs, CD-ROM/RWs, or the like. As magneto optical storage media, there are MOs (Magneto-Optical disk) or the like.

For distribution of a program, for example, a portable storage medium storing the program, such as a DVD, a CD-ROM, or the like is sold. In addition, a program may be stored in a storage device of a server computer, and the program may be transferred to another computer from the server computer via a network.

A computer supposed to execute a program stores, in a storage device thereof, the program stored on a portable storage medium or the program transferred from the server computer, for example. The computer then reads the program from the storage device thereof and performs a process according to the program. The computer may also read the program directly from the portable storage medium and perform a process according to the program. In addition, each time a program is transferred from the server computer connected via a network, the computer may also sequentially perform a process according to the received program.

In addition, at least a part of the processing function described above may be realized by an electronic circuit such as a DSP, an ASIC, a PLD, or the like.

According to an aspect, releasing of physical resources may be easily performed in the storage apparatus and the area releasing method.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present embodiments have been described in detail, it should be understood that various changes, substitutions, and alterations could be made hereto without departing from the spirit and scope of the invention.

What is claimed is:

1. A storage apparatus comprising:
   a memory configured to store management information relating to resource references from management unit areas of logical volumes to physical resources allocated thereto; and
   one or more processors configured to perform a procedure including:
   performing data copy from a copy source logical volume to a copy destination logical volume,
   accepting a first release command to release a physical resource that has been allocated to a first management unit area of the copy source logical volume,
   preparing a data saving logical volume having no allocation of physical resources,
   updating, in response to the first release command, the management information in a manner that exchanges resource references between the first management unit area of the copy source logical volume and a second management unit area of the data saving logical volume, and
   providing, asynchronously with the preparing of the data saving logical volume, a first response to the first release command and performing, asynchronously with the first response, data copy from the second management unit area of the data saving logical volume to the copy destination logical volume.

2. The storage apparatus according to claim 1, wherein:
   a physical resource allocated to a third management unit area of the copy source logical volume is being referred to by a plurality of management unit areas of the copy destination logical volume, and
   the procedure further includes:
   accepting a second release command to release the physical resource that has been allocated to the third management unit area of the copy source logical volume,
   updating, in response to the second release command, the management information in a manner that exchanges resource references between the third management unit area of the copy source logical volume and a fourth management unit area of the data saving logical volume that has no allocation of physical resources, and
   providing a second response to the second release command and performing, asynchronously with the second response, data copy from the fourth management unit area of the data saving logical volume to the copy destination logical volume.

3. The storage apparatus according to claim 1, wherein:
there is a plurality of copy destination logical volumes having generation relationship with the copy source logical volume,
a physical resource allocated to a third management unit area of one of the copy destination logical volumes is being referred to from a fourth management unit area of another one of the copy destination logical resources, and that belongs to a previous generation, the fourth management unit area having no physical resource allocated, and
the procedure further includes:
  receiving a second release request to release the third management unit area of the one of the plurality of copy destination logical volumes,
  updating, in response to the second release request, the management information in a manner that exchanges resource references between the third management unit area and the fourth management unit area, and
  providing a second response to the second release command.

4. The storage apparatus according to claim 1, wherein:
there is a plurality of copy destination logical volumes having generation relationship with the copy source logical volume,
a physical resource allocated to a third management unit area of a first one of the copy destination logical volumes is being referred to from a fourth management unit area of a second one of the copy destination logical volumes that belongs to a previous generation, and
the procedure further includes:
  receiving a second release request to release the third management unit area of the first one of the copy destination logical volumes,
  updating, in response to the second release request, the management information in a manner that exchanges resource references between the third management unit area and a fifth management unit area of the data saving logical volume having no allocation of physical resources, and
  providing a second response to the second release command and performing, asynchronously with the second response, data copy from the fifth management unit area of the data saving logical volume to the second one of the copy destination logical volumes.

5. The storage apparatus according to claim 1, wherein:
there is a plurality of copy destination logical volumes having generation relationship with the copy source logical volume,
a physical resource allocated to a third management unit area of a first one of the copy destination logical volumes is being referred to from a plurality of management unit areas of a second one of the copy destination logical volumes that belongs to a previous generation, and
the procedure further includes:
  receiving a second release request to release the third management unit area of the first one of the copy destination logical volumes,
  updating, in response to the second release request, the management information in a manner that exchanges resource references between the third management unit area and a fourth management unit area of the data saving logical volume having no allocation of physical resources, and
  providing a second response to the second release command and performing, asynchronously with the response, data copy from the fourth management unit area of the data saving logical volume to the second one of the copy destination logical volumes.

6. A non-transitory computer-readable storage medium storing an area releasing program that causes a computer to perform a procedure comprising:
managing resource references from management unit areas of logical volumes to physical resources allocated thereto,
performing data copy from a copy source logical volume to a copy destination logical volume,
accepting a release command to release a physical resource that has been allocated to a first management unit area of the copy source logical volume,
preparing a data saving logical volume having no allocation of physical resources,
exchanging, in response to the release command, resource references between the first management unit area of the copy source logical volume and a second management unit area of the data saving logical volume, and
providing, asynchronously with the preparing of the data saving logical volume, a response to the release command and performing, asynchronously with the response, data copy from the second management unit area of the data saving logical volume to the copy destination logical volume.

7. An area releasing method comprising:
managing, by a computer, resource references from management unit areas of logical volumes to physical resources allocated thereto,
performing, by the computer, data copy from a copy source logical volume to a copy destination logical volume,
accepting, by the computer, a release command to release a physical resource that has been allocated to a first management unit area of the copy source logical volume,
preparing, by the computer, a data saving logical volume having no allocation of physical resources,
exchanging, by the computer in response to the release command, resource references between the first management unit area of the copy source logical volume and a second management unit area of the data saving logical volume, and
providing, asynchronously with the preparing of the data saving logical volume, a response to the release command and performing, asynchronously with the response, data copy from the second management unit area of the data saving logical volume to the copy destination logical volume.

* * * * *